(12) United States Patent
Mateescu et al.

(10) Patent No.: US 10,228,878 B1
(45) Date of Patent: Mar. 12, 2019

(54) WEAR LEVELING IN NON-VOLATILE STORAGE

(71) Applicant: Western Digital Technologies, Inc., San Jose, CA (US)

(72) Inventors: Robert Mateescu, San Jose, CA (US); Cyril Guyot, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/797,672

(22) Filed: Oct. 30, 2017

(51) Int. Cl.
*G06F 3/06* (2006.01)
*G06F 12/10* (2016.01)

(52) U.S. Cl.
CPC .......... *G06F 3/0649* (2013.01); *G06F 3/0616* (2013.01); *G06F 3/0679* (2013.01); *G06F 12/10* (2013.01); *G06F 2212/1036* (2013.01); *G06F 2212/202* (2013.01)

(58) Field of Classification Search
None
See application file for complete search history.

(56) References Cited

U.S. PATENT DOCUMENTS

| 7,085,879 B2 | 8/2006 | Aasheim et al. |
| 2010/0281202 A1 | 11/2010 | Abali et al. |

OTHER PUBLICATIONS

Micron, "Wear-Leveling Techniques in NAND Flash Devices," TN-29-42: Wear-Leveling Techniques in NAND Flash Devices, Jun. 2006, 8 pages.
Qureshi, Moinuddin K., et al., "Enhancing Lifetime and Security of PCM-Based Main Memory with Start-Gap Wear Leveling," Micron 2009, Dec. 2009, 10 pages.

*Primary Examiner* — Kevin Verbrugge
(74) *Attorney, Agent, or Firm* — Vierra Magen Marcus LLP

(57) ABSTRACT

Technology is described for performing wear leveling in non-volatile storage. Mapping from logical addresses to intermediate addresses may be performed without the use of a mapping table having an entry for each page. Intermediate addresses may be mapped to physical addresses in a physical address space partitioned into a number of buckets. Wear-leveling may be performed within each bucket by, for example, rotating data within a bucket. The bucket size and rotation rate may be selected to keep wear on the memory cells well with tolerance. The mapping from logical addresses to intermediate addresses may periodically be changed, with an associated move of data from one bucket to another bucket to provide additional wear leveling.

20 Claims, 14 Drawing Sheets

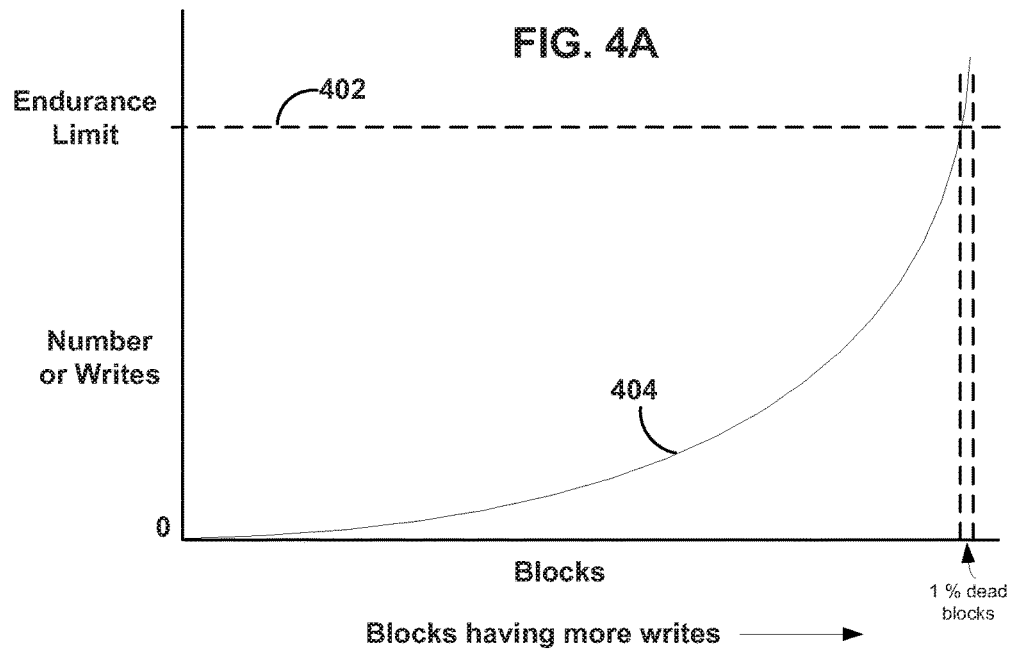
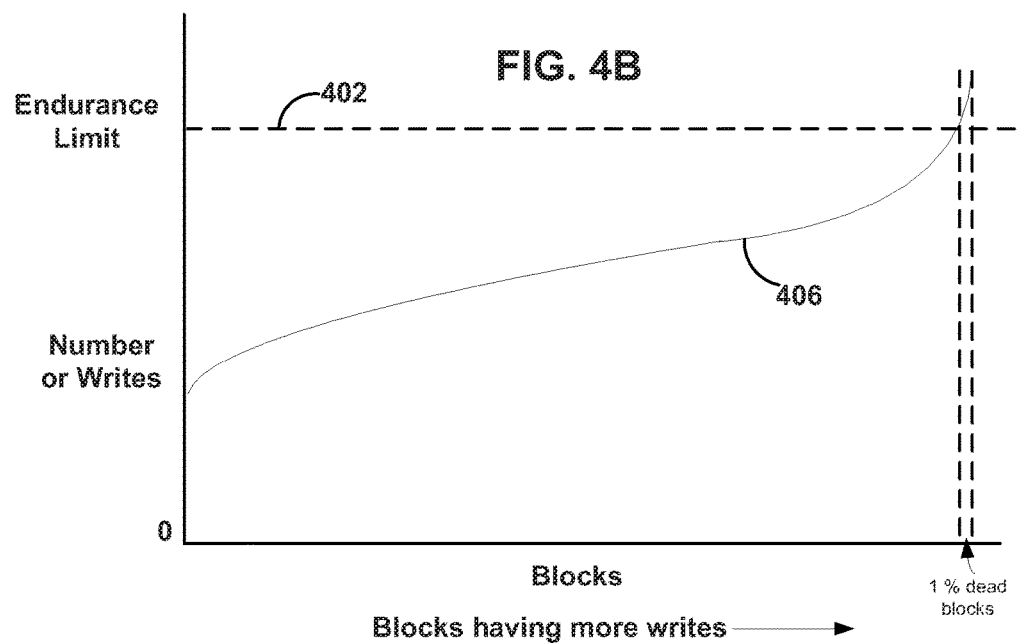

WEAR LEVELING IN NON-VOLATILE STORAGE

BACKGROUND

Semiconductor memory is widely used in various electronic devices such as mobile computing devices, mobile phones, solid-state drives, digital cameras, personal digital assistants, medical electronics, servers, and non-mobile computing devices. Semiconductor memory may include non-volatile memory or volatile memory. A non-volatile memory device allows information to be stored or retained even when the non-volatile memory device is not connected to a power source.

One example of non-volatile memory uses memory cells that include reversible resistance-switching memory elements that may be set to two or more different resistance states, such as a low resistance state and a high resistance state. The memory cells may be individually connected between first and second conductors (e.g., a bit line electrode and a word line electrode). The state of such a memory cell is typically changed by proper voltages being placed on the first and second conductors. Such memory cells may be referred to herein as "resistive random access memory" (ReRAM). Since the resistivity of the memory element may be repeatedly switched between high a low resistance states, such memory cells may also be referred to as reversible resistivity memory cells.

Other non-volatile memory cells store data based on some other physical parameter. For example, some memory cells are programmed by storing charge in a charge storage region to impact a threshold voltage of the non-volatile memory cell. Such memory cells may be programmed to different threshold voltage states.

For a variety of reasons, non-volatile memory cells have a limited lifetime. Wear leveling is used in non-volatile storage to spread wear over non-volatile memory cells, which can help extend the lifetime of the non-volatile storage.

BRIEF DESCRIPTION OF THE DRAWINGS

FIG. 4A depicts a curve to show an endurance problem for a memory device under an adversarial attack.

FIG. 4B is graph to show how endurance can be improved for one embodiment of a memory device under an adversarial attack.

DETAILED DESCRIPTION

Figure 1A:
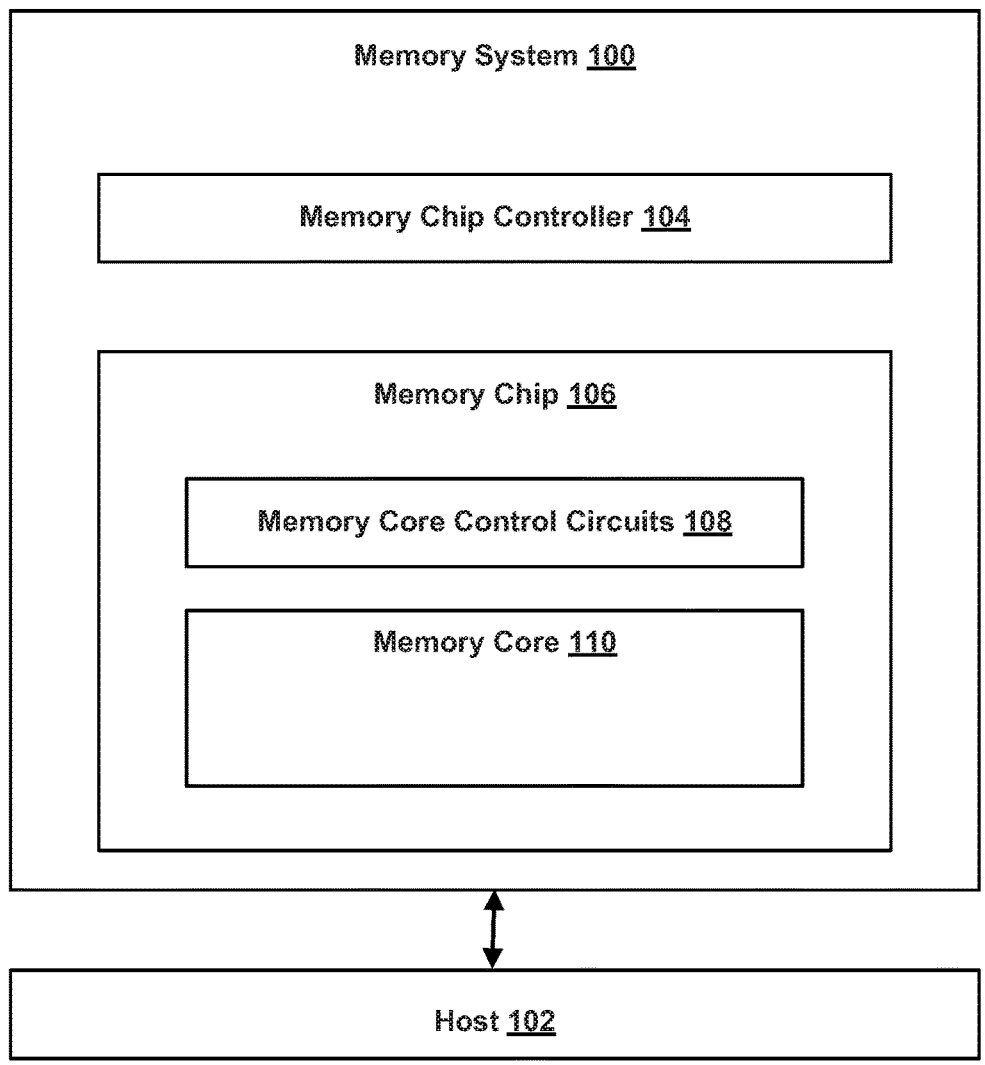
FIG. 1A depicts an embodiment of a memory system and a host.

Technology is described for performing wear leveling in non-volatile storage. Some wear leveling techniques may employ tables that map from logical addresses to physical addresses. The memory device may change the mapping in the table when moving the data at one physical location to another physical location. As one example, the memory device can move a page of data from one set of memory cells to another set of memory cells. In some table based wear leveling techniques, the table needs to contain an entry for each page in the physical address space. For efficient operation, the mapping table may be stored in RAM. If the mapping table is not stored in RAM, then latency may be increased. The number of pages in the physical address space of the memory device could be quite large, depending on the page size and capacity. Hence, the mapping table may need to be very large.

Embodiments of non-volatile storage devices disclosed herein are configured to efficiently perform wear leveling when the physical address space contains a very large number of pages. For example, embodiments of non-volatile storage devices disclosed herein are configured to perform wear leveling efficiently when there are over one billion pages in the physical address space. As one example, some types of non-volatile storage may allow small page sizes. For example, "resistive random access memory" (ReRAM) may allow page size of 8 Bytes, or even smaller. Of course, even if the pages are larger, there can still be a very large number of pages if the memory capacity is extremely high.

Embodiments of non-volatile storage devices disclosed herein are configured to perform wear leveling in a manner that efficiently uses volatile memory (e.g., RAM). Embodiments of non-volatile storage devices disclosed herein are configured to perform wear leveling with low latency. In one embodiment, mapping from logical addresses to physical addresses is performed without the use of a mapping table having an entry for each page. Therefore, non-volatile memory requirements may be reduced, while providing for low latency. In one embodiment, a mapper performs a random mapping from logical addresses to intermediate addresses. The random mapping may comprise performing random permutations. This avoids the need for large mapping tables.

Some conventional wear leveling techniques are susceptible to adversarial attacks. An adversarial attack refers to writing to the same logical address repeatedly.

Note that if the mapping from the logical address to the physical address is not changed frequently enough, then the memory cells at the physical address(es) may wear out. If too many memory cells wear out, the non-volatile storage device may fail. An adversarial attack may be done maliciously by, for example, a user attempting to cause failure of the memory device. An adversarial attack may be done inadvertently by, for example, a software program making frequent updates to the same logical address.

Embodiments of non-volatile storage devices disclosed herein are configured to thwart adversarial attacks. In one embodiment, the physical address space is partitioned into a number of buckets. Wear-leveling is performed within each bucket, in one embodiment. In one embodiment, there are no empty spaces in the buckets. In other words, valid data may be concurrently stored at all of the physical addresses in a bucket, which allows the entire physical address space to be used. In one embodiment, data at two physical locations is swapped with each other, as a part of the wear leveling. In one embodiment, the data gets rotated through the bucket in a pre-determined number of cycles. The bucket size and rotation rate may be selected to keep wear on the memory cells well with tolerance.

In one embodiment, the data that is in a bucket is periodically moved to another bucket. Note that this does not mean all of the data on one bucket is moved to the same bucket. Rather, the data in one bucket may be spread between multiple buckets. In one embodiment, the data is moved in response to changing the mapping between the logical addresses and the intermediate addresses.

In some embodiments, wear-leveling is performed for memory cells in a cross-point memory array. A cross-point memory array may refer to a memory array in which two-terminal memory cells are placed at the intersections of a first set of control lines (e.g., word lines) arranged in a first direction and a second set of control lines (e.g., bit lines) arranged in a second direction perpendicular to the first direction. The two-terminal memory cells may include a reversible resistance-switching memory element disposed between first and second conductors. Example reversible resistance-switching memory elements include a phase change material, a ferroelectric material, a metal oxide (e.g., hafnium oxide), a barrier modulated switching structure, or other similar reversible resistance-switching memory elements.

In some embodiments, each memory cell in a cross-point memory array includes a reversible resistance-switching memory element in series with a steering element or an isolation element, such as a diode, to reduce leakage currents. In other cross-point memory arrays, the memory cells do not include an isolation element.

In an embodiment, a non-volatile storage system may include one or more two-dimensional arrays of non-volatile memory cells. The memory cells within a two-dimensional memory array may form a single layer of memory cells and may be selected via control lines (e.g., word lines and bit lines) in the X and Y directions. In another embodiment, a non-volatile storage system may include one or more monolithic three-dimensional memory arrays in which two or more layers of memory cells may be formed above a single substrate without any intervening substrates.

In some cases, a three-dimensional memory array may include one or more vertical columns of memory cells located above and orthogonal to a substrate. In an example, a non-volatile storage system may include a memory array with vertical bit lines or bit lines that are arranged orthogonal to a semiconductor substrate. The substrate may include a silicon substrate. The memory array may include rewriteable non-volatile memory cells, wherein each memory cell includes a reversible resistance-switching memory element without an isolation element in series with the reversible resistance-switching memory element (e.g., no diode in series with the reversible resistance-switching memory element).

In some embodiments, a non-volatile storage system may include a non-volatile memory that is monolithically formed in one or more physical levels of arrays of memory cells having an active area disposed above a silicon substrate. The non-volatile storage system may also include circuitry associated with the operation of the memory cells (e.g., decoders, state machines, page registers, and/or control circuitry for controlling reading, programming and erasing of the memory cells). The circuitry associated with the operation of the memory cells may be located above the substrate or within the substrate.

In some embodiments, a non-volatile storage system may include a monolithic three-dimensional memory array. The monolithic three-dimensional memory array may include one or more levels of memory cells. Each memory cell within a first level of the one or more levels of memory cells may include an active area that is located above a substrate (e.g., above a single-crystal substrate or a crystalline silicon substrate). In one example, the active area may include a semiconductor junction (e.g., a P-N junction). The active area may include a portion of a source or drain region of a transistor. In another example, the active area may include a channel region of a transistor.

FIG. 1A depicts one embodiment of a memory system 100 and a host 102. Memory system 100 may include a non-volatile storage system interfacing with host 102 (e.g., a mobile computing device). In some cases, memory system 100 may be embedded within host 102. In other cases, memory system 100 may include a memory card. As depicted, memory system 100 includes a memory chip controller 104 and a memory chip 106. Although a single memory chip 106 is depicted, memory system 100 may include more than one memory chip (e.g., four, eight or some other number of memory chips). Memory chip controller 104 may receive data and commands from host 102 and provide memory chip data to host 102.

Memory chip controller 104 may include one or more state machines, page registers, SRAM, and control circuitry for controlling the operation of memory chip 106. The one or more state machines, page registers, SRAM, and control circuitry for controlling the operation of memory chip 106 may be referred to as managing or control circuits. The managing or control circuits may facilitate one or more memory array operations, such as forming, erasing, programming, sensing, and reading operations.

In some embodiments, the managing or control circuits (or a portion of the managing or control circuits) for facilitating one or more memory array operations may be integrated within memory chip 106. Memory chip controller 104 and memory chip 106 may be arranged on a single integrated circuit. In other embodiments, memory chip controller 104 and memory chip 106 may be arranged on different integrated circuits. In some cases, memory chip controller 104 and memory chip 106 may be integrated on a system board, logic board, or a PCB.

Memory chip 106 includes memory core control circuits 108 and a memory core 110. Memory core control circuits 108 may include logic for controlling the selection of memory blocks (or arrays) within memory core 110, controlling the generation of voltage references for biasing a particular memory array into a read or write state, and generating row and column addresses.

Memory core 110 may include one or more two-dimensional arrays of memory cells or one or more three-dimensional arrays of memory cells. In an embodiment, memory core control circuits 108 and memory core 110 are arranged on a single integrated circuit. In other embodiments, memory core control circuits 108 (or a portion of memory core control circuits 108) and memory core 110 may be arranged on different integrated circuits.

A memory operation may be initiated when host 102 sends instructions to memory chip controller 104 indicating that host 102 would like to read data from memory system 100 or write data to memory system 100. In the event of a write (or programming) operation, host 102 will send to memory chip controller 104 both a write command and the data to be written. The data to be written may be buffered by memory chip controller 104 and error correcting code (ECC) data may be generated corresponding with the data to be written. The ECC data, which allows data errors that occur during transmission or storage to be detected and/or corrected, may be written to memory core 110 or stored in non-volatile memory within memory chip controller 104. In an embodiment, the ECC data are generated and data errors are corrected by circuitry within memory chip controller 104.

Memory chip controller 104 controls operation of memory chip 106. In one example, before issuing a write operation to memory chip 106, memory chip controller 104 may check a status register to make sure that memory chip 106 is able to accept the data to be written. In another example, before issuing a read operation to memory chip 106, memory chip controller 104 may pre-read overhead information associated with the data to be read. The overhead information may include ECC data associated with the data to be read or a redirection pointer to a new memory location within memory chip 106 in which to read the data requested. Once a read or write operation is initiated by memory chip controller 104, memory core control circuits 108 may generate the appropriate bias voltages for word lines and bit lines within memory core 110, and generate the appropriate memory block, row, and column addresses.

In some embodiments, one or more managing or control circuits may be used for controlling the operation of a memory array. The one or more managing or control circuits may provide control signals to a memory array to perform an erase operation, a read operation, and/or a write operation on the memory array. In one example, the one or more managing or control circuits may include any one of or a combination of control circuitry, state machine, decoders, sense amplifiers, read/write circuits, and/or controllers. The one or more managing circuits may perform or facilitate one or more memory array operations including wear-leveling, erasing, programming, or reading operations. In one example, one or more managing circuits may include an on-chip memory controller for determining row and column address, word line and bit line addresses, memory array enable signals, and data latching signals.

Figure 1B:
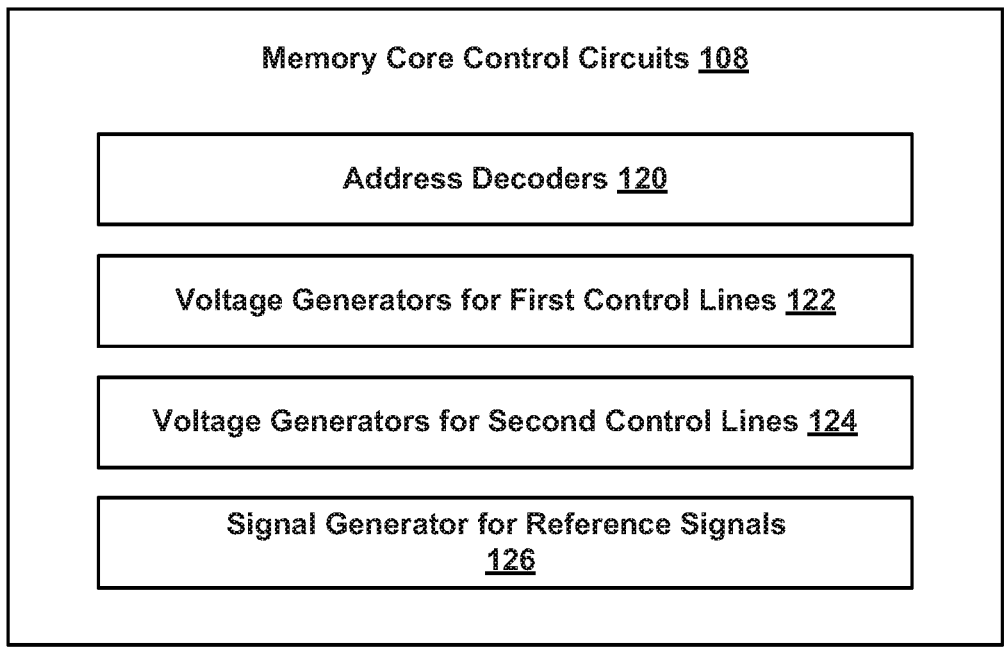
FIG. 1B depicts an embodiment of memory core control circuits.

FIG. 1B depicts one embodiment of memory core control circuits 108. As depicted, memory core control circuits 108 include address decoders 120, voltage generators for first control lines 122, voltage generators for second control lines 124 and signal generators for reference signals 126 (described in more detail below). Control lines may include word lines, bit lines, or a combination of word lines and bit lines. First control lines may include first (e.g., selected) word lines and/or first (e.g., selected) bit lines that are used to place memory cells into a first (e.g., selected) state. Second control lines may include second (e.g., unselected) word lines and/or second (e.g., unselected) bit lines that are used to place memory cells into a second (e.g., unselected) state.

Address decoders 120 may generate memory block addresses, as well as row addresses and column addresses for a particular memory block. Voltage generators (or voltage regulators) for first control lines 122 may include one or more voltage generators for generating first (e.g., selected) control line voltages. Voltage generators for second control lines 124 may include one or more voltage generators for generating second (e.g., unselected) control line voltages. Signal generators for reference signals 126 may include one or more voltage and/or current generators for generating reference voltage and/or current signals.

FIGS. 1C-1F depict one embodiment of a memory core organization that includes a memory core having multiple memory bays, and each memory bay having multiple memory blocks. Although a memory core organization is disclosed where memory bays include memory blocks, and memory blocks include a group of memory cells, other organizations or groupings also can be used with the technology described herein.

Figure 1C:
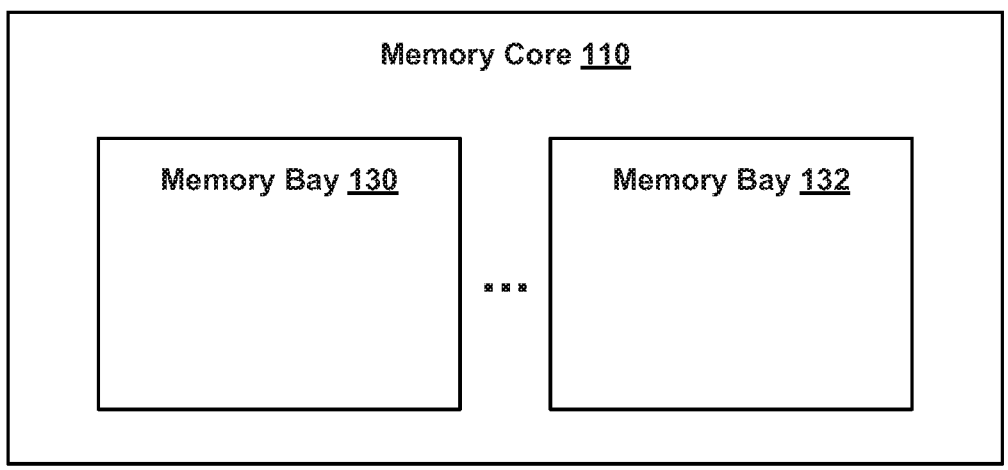
FIG. 1C depicts an embodiment of a memory core.

FIG. 1C depicts an embodiment of memory core 110 of FIG. 1A. As depicted, memory core 110 includes memory bay 130 and memory bay 132. In some embodiments, the number of memory bays per memory core can differ for different implementations. For example, a memory core may include only a single memory bay or multiple memory bays (e.g., 16 or other number of memory bays).

Figure 1D:
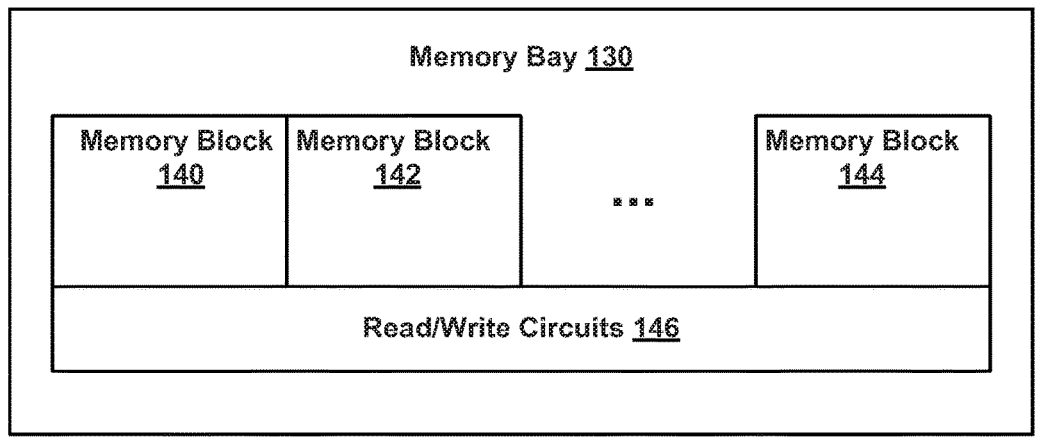
FIG. 1D depicts an embodiment of a memory bay.

FIG. 1D depicts an embodiment of memory bay 130 in FIG. 1C. As depicted, memory bay 130 includes memory blocks 140-144 and read/write circuits 146. In some embodiments, the number of memory blocks per memory bay may differ for different implementations. For example, a memory bay may include one or more memory blocks (e.g., 32 or other number of memory blocks per memory bay). Read/write circuits 146 include circuitry for reading and writing memory cells within memory blocks 140-144.

As depicted, read/write circuits 146 may be shared across multiple memory blocks within a memory bay. This allows chip area to be reduced because a single group of read/write circuits 146 may be used to support multiple memory blocks. However, in some embodiments, only a single memory block may be electrically coupled to read/write circuits 146 at a particular time to avoid signal conflicts.

In some embodiments, read/write circuits 146 may be used to write one or more pages of data into memory blocks 140-144 (or into a subset of the memory blocks). The memory cells within memory blocks 140-144 may permit direct over-writing of pages (i.e., data representing a page or a portion of a page may be written into memory blocks 140-144 without requiring an erase or reset operation to be performed on the memory cells prior to writing the data).

In one example, memory system 100 of FIG. 1A may receive a write command including a target address and a set of data to be written to the target address. Memory system 100 may perform a read-before-write (RBW) operation to read the data currently stored at the target address and/or to acquire overhead information (e.g., ECC information) before performing a write operation to write the set of data to the target address.

In some cases, read/write circuits 146 may be used to program a particular memory cell to be in one of three or more data/resistance states (i.e., the particular memory cell may include a multi-level memory cell). In one example, read/write circuits 146 may apply a first voltage difference (e.g., 2V) across the particular memory cell to program the particular memory cell into a first state of the three or more data/resistance states or a second voltage difference (e.g., 1V) across the particular memory cell that is less than the first voltage difference to program the particular memory cell into a second state of the three or more data/resistance states.

Applying a smaller voltage difference across the particular memory cell may cause the particular memory cell to be partially programmed or programmed at a slower rate than when applying a larger voltage difference. In another example, read/write circuits 146 may apply a first voltage difference across the particular memory cell for a first time period to program the particular memory cell into a first state of the three or more data/resistance states, and apply the first voltage difference across the particular memory cell for a second time period less than the first time period. One or more programming pulses followed by a memory cell verification phase may be used to program the particular memory cell to be in the correct state.

Figure 1E:
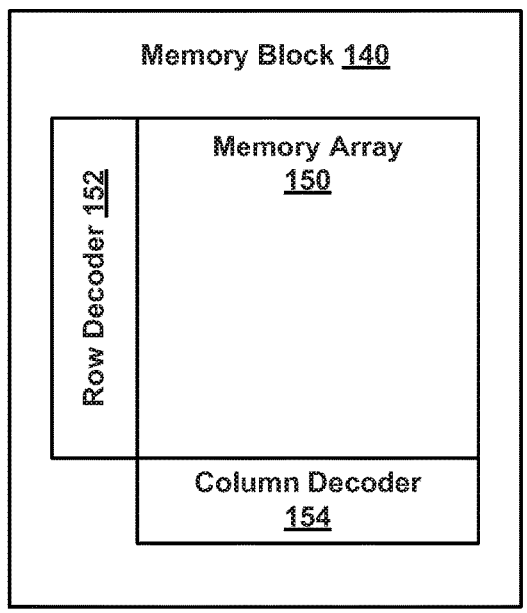
FIG. 1E depicts an embodiment of a memory block.

FIG. 1E depicts an embodiment of memory block 140 in FIG. 1D. As depicted, memory block 140 includes a memory array 150, row decoder 152, and column decoder 154. Memory array 150 may include a contiguous group of memory cells having contiguous word lines and bit lines. Memory array 150 may include one or more layers of memory cells. Memory array 150 may include a two-dimensional memory array or a three-dimensional memory array.

Row decoder 152 decodes a row address and selects a particular word line in memory array 150 when appropriate (e.g., when reading or writing memory cells in memory array 150). Column decoder 154 decodes a column address and selects one or more bit lines in memory array 150 to be electrically coupled to read/write circuits, such as read/write circuits 146 in FIG. 1D. In one embodiment, the number of word lines is 4K per memory layer, the number of bit lines is 1K per memory layer, and the number of memory layers is 4, providing a memory array 150 containing 16M memory cells.

Figure 1F:
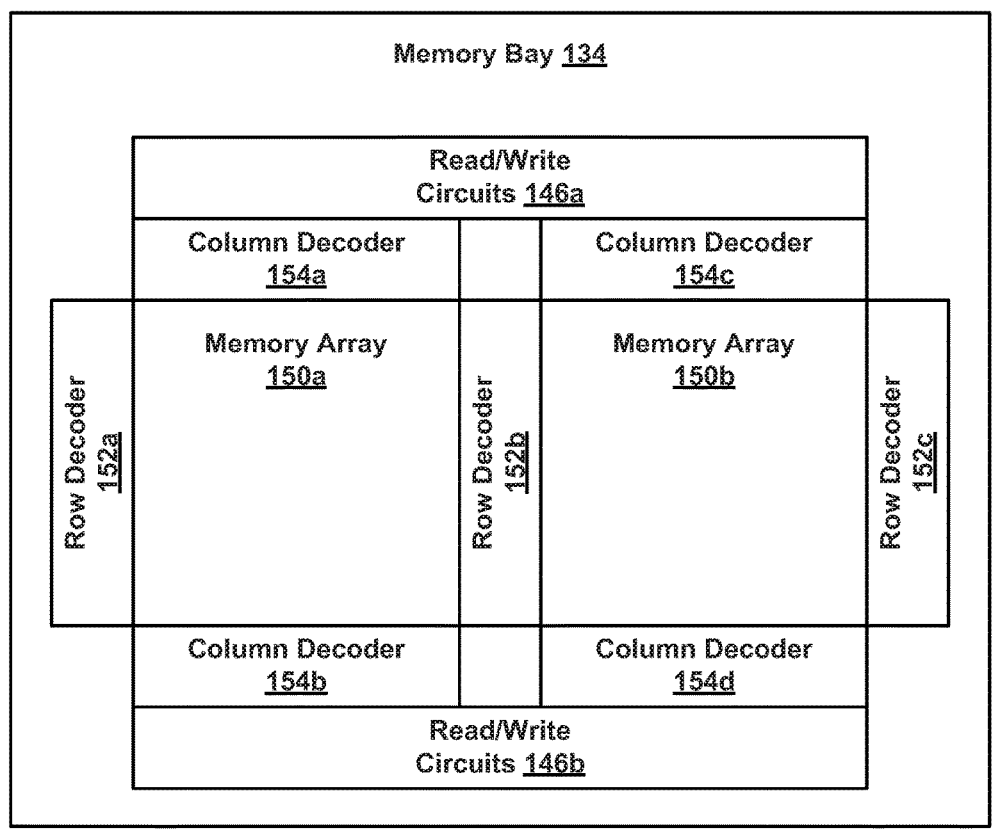
FIG. 1F depicts another embodiment of a memory bay.

FIG. 1F depicts an embodiment of a memory bay 134. Memory bay 134 is an alternative example implementation for memory bay 130 of FIG. 1D. In some embodiments, row decoders, column decoders, and read/write circuits may be split or shared between memory arrays. As depicted, row decoder 152b is shared between memory arrays 150a and 150b because row decoder 152b controls word lines in both memory arrays 150a and 150b (i.e., the word lines driven by row decoder 152b are shared).

Row decoders 152a and 152b may be split such that even word lines in memory array 150a are driven by row decoder 152a and odd word lines in memory array 150a are driven by row decoder 152b. Row decoders 152c and 152b may be split such that even word lines in memory array 150b are driven by row decoder 152c and odd word lines in memory array 150b are driven by row decoder 152b.

Column decoders 154a and 154b may be split such that even bit lines in memory array 150a are controlled by column decoder 154b and odd bit lines in memory array 150a are driven by column decoder 154a. Column decoders 154c and 154d may be split such that even bit lines in memory array 150b are controlled by column decoder 154d and odd bit lines in memory array 150b are driven by column decoder 154c.

The selected bit lines controlled by column decoder 154a and column decoder 154c may be electrically coupled to read/write circuits 146a. The selected bit lines controlled by column decoder 154b and column decoder 154d may be electrically coupled to read/write circuits 146b. Splitting the read/write circuits into read/write circuits 146a and 146b when the column decoders are split may allow for a more efficient layout of the memory bay.

Figure 1G:
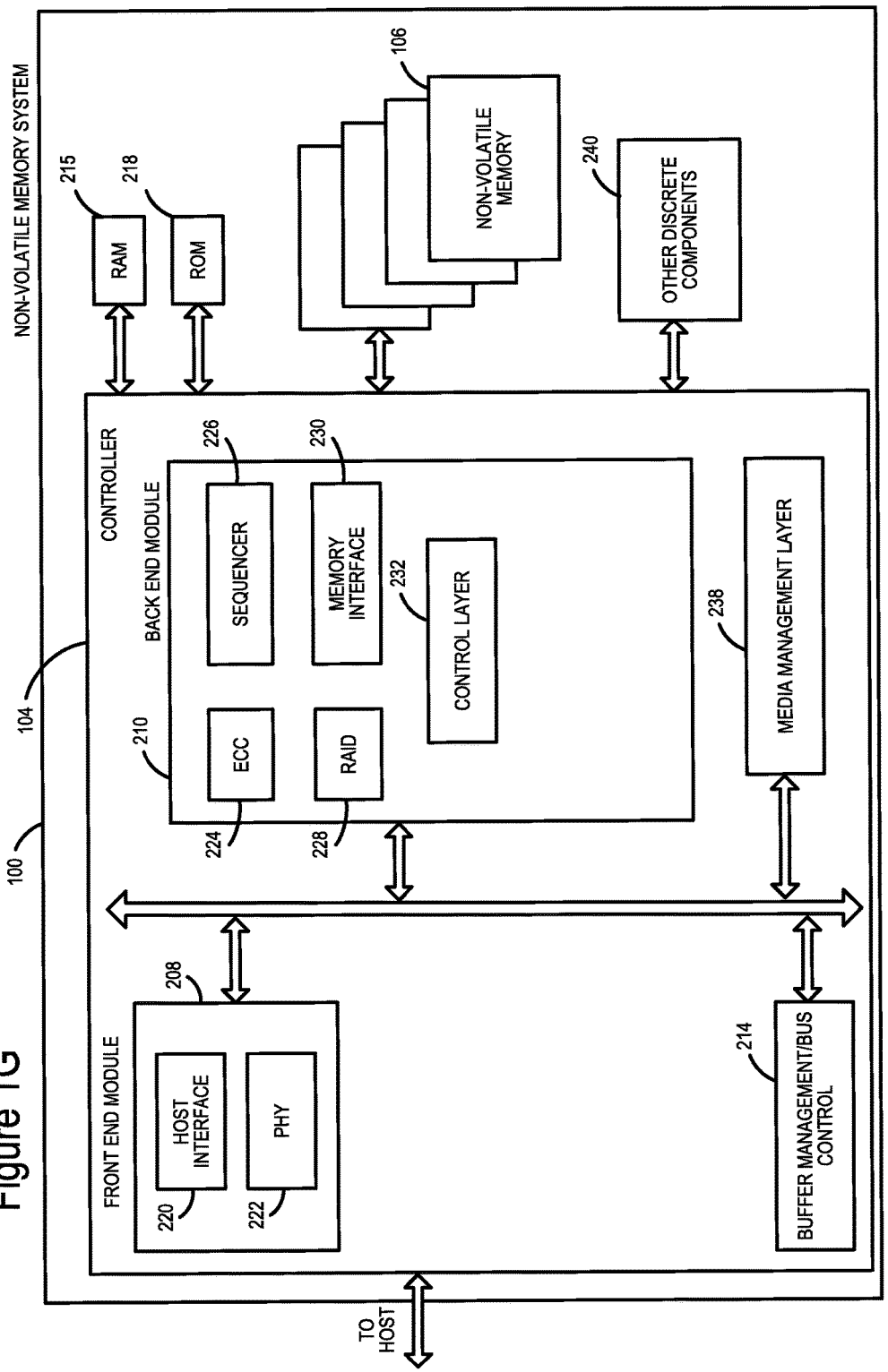
FIG. 1G is a block diagram of example memory system 100, depicting more details of Controller 104.

FIG. 1G is a block diagram of example memory system 100, depicting more details of Controller 104. In one embodiment, the system of FIG. 1G is a solid state drive. As used herein, a memory Controller is a device that manages data stored on memory and communicates with a host, such as a computer or electronic device. A memory Controller can have various functionality in addition to the specific functionality described herein. For example, the memory Controller can format the memory to ensure the memory is operating properly, map out bad memory cells, and allocate spare memory cells to be substituted for future failed cells. Some part of the spare cells can be used to hold firmware to operate the memory Controller and implement other features. In operation, when a host needs to read data from or write data to the memory, it will communicate with the memory Controller. If the host provides a logical address (LA) to which data is to be read/written, the memory Controller can convert the logical address received from the host to a physical address in the memory. (Alternatively, the host can provide the physical address). The memory Controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between Controller 104 and non-volatile memory die 106 may be any suitable interface. In one embodiment, memory system 100 may be a card based system, such as a secure digital (SD) or a micro secure digital (micro-SD) card. In an alternative embodiment, memory system 100 may be part of an embedded memory system. For example, the memory may be embedded within the host, such as in the form of a solid state disk (SSD) drive installed in a personal computer.

In some embodiments, non-volatile memory system 100 includes a single channel between Controller 104 and non-volatile memory die 106, the subject matter described herein is not limited to having a single memory channel. For example, in some memory system architectures, 2, 4, 8 or more channels may exist between the Controller and the memory die, depending on Controller capabilities. In any of the embodiments described herein, more than a single channel may exist between the Controller and the memory die, even if a single channel is shown in the drawings.

As depicted in FIG. 1G, Controller 104 includes a front end module 208 that interfaces with a host, a back end module 210 that interfaces with the one or more non-volatile memory die 106, and various other modules that perform functions which will now be described in detail. Front end module 208 may be referred to herein as a "communication interface."

The components of Controller 104 depicted in FIG. 1G may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include or comprise software stored in a processor readable device (e.g., memory) to program a one or more processors for Controller 104 to perform the functions described herein.

Referring again to modules of the Controller 104, a buffer manager/bus Controller 214 manages buffers in random access memory (RAM) 215 and controls the internal bus arbitration of Controller 104. A read only memory (ROM) 218 stores system boot code. Although illustrated in FIG. 1G as located separately from the Controller 104, in other embodiments one or both of the RAM 215 and ROM 218 may be located within the Controller. In yet other embodiments, portions of RAM and ROM may be located both within the Controller 104 and outside the Controller. Further, in some implementations, the Controller 104, RAM 215, and ROM 218 may be located on separate semiconductor die.

Front end module 208 includes a host interface 220 and a physical layer interface (PHY) 222 that provide the electrical interface with the host or next level storage device. The choice of the type of host interface 220 can depend on the type of memory being used. Examples of host interfaces 220 include, but are not limited to, SATA, SATA Express, SAS, Fibre Channel, USB, PCIe, and NVMe. The host interface 220 typically facilitates transfer for data, control signals, and timing signals.

Back end module 210 includes an error correction Controller (ECC) engine 224 that encodes the data bytes received from the host, and decodes and error corrects the data bytes read from the non-volatile memory. A command sequencer 226 generates command sequences, such as program and erase command sequences, to be transmitted to non-volatile memory die 106. A RAID (Redundant Array of Independent Dies) module 228 manages generation of RAID parity and recovery of failed data. The RAID parity may be used as an additional level of integrity protection for the data being written into the non-volatile memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. A memory interface 230 provides the command sequences to non-volatile memory die 106 and receives status information from non-volatile memory die 106. In one embodiment, memory interface 230 may be a double data rate (DDR) interface. A control layer 232 controls the overall operation of back end module 210.

Additional components of system 100 illustrated in FIG. 1G include media management layer 238, which performs wear leveling of memory cells of non-volatile memory die 106. System 100 also includes other discrete components 240, such as external electrical interfaces, external RAM, resistors, capacitors, or other components that may interface with Controller 104. In alternative embodiments, one or more of the physical layer interface 222, RAID module 228, media management layer 238 and buffer management/bus Controller 214 are optional components that are not necessary in the Controller 104.

The Media Management Layer (MML) 238 may handle non-volatile memory errors and interface with the host. In particular, MML may be responsible for the internals of non-volatile memory management. In particular, the MML 238 may include an algorithm in the memory device firmware which translates writes from the host into writes to the non-volatile memory of die 106. The MML 238 may be needed because: 1) the non-volatile memory may have limited endurance; 2) the non-volatile memory may only be written in multiples of pages; and/or 3) the non-volatile memory may not be written unless it is erased as a block. The MML 238 understands these potential limitations of the non-volatile memory which may not be visible to the host. Accordingly, the MML 238 attempts to translate the writes from host into writes into the non-volatile memory.

Controller 104 may interface with one or more memory dies 106. In one embodiment, Controller 104 and multiple memory dies (together comprising non-volatile storage system 100) implement a solid state drive (SSD), which can emulate, replace or be used instead of a hard disk drive inside a host, as a NAS device, etc. Additionally, the SSD need not be made to work as a hard drive.

Figure 2A:
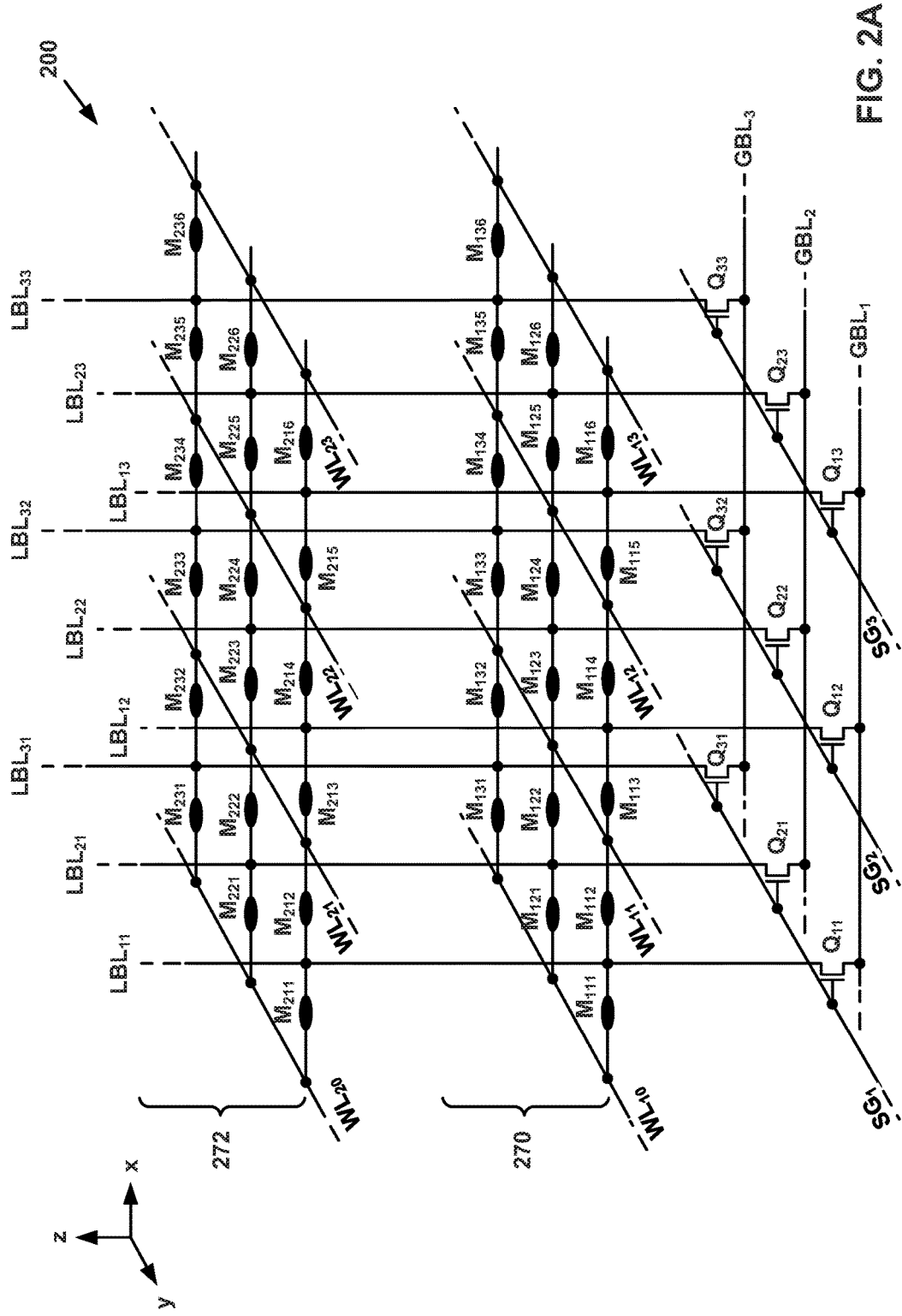
FIG. 2A depicts an embodiment of a portion of a monolithic three-dimensional memory array.

FIG. 2A depicts one embodiment of a portion of a monolithic three-dimensional memory array 200 that includes a first memory level 270, and a second memory level 272 positioned above first memory level 270. Memory array 200 is one example of an implementation for memory array 150 of FIG. 1E. Local bit lines $LBL_{11}$-$LBL_{33}$ are arranged in a first direction (e.g., a vertical or z-direction) and word lines $WL_{10}$-$WL_{23}$ are arranged in a second direction (e.g., an x-direction) perpendicular to the first direction. This arrangement of vertical bit lines in a monolithic three-dimensional memory array is one embodiment of a vertical bit line memory array.

As depicted, disposed between the intersection of each local bit line and each word line is a particular memory cell (e.g., memory cell Min is disposed between local bit line $LBL_{11}$ and word line $WL_{10}$). The particular memory cell may include a floating gate memory element, a charge trap memory element (e.g., using a silicon nitride material), a reversible resistance-switching memory element, or other similar device. The global bit lines $GBL_1$-$GBL_3$ are arranged in a third direction (e.g., a y-direction) that is perpendicular to both the first direction and the second direction.

Each local bit line $LBL_{11}$-$LBL_{33}$ has an associated bit line select transistor $Q_{11}$-$Q_{33}$, respectively. Bit line select transistors $Q_{11}$-$Q_{33}$ may be field effect transistors, such as shown, or may be any other transistors. As depicted, bit line select transistors $Q_{11}$-$Q_{31}$ are associated with local bit lines $LBL_{11}$-$LBL_{31}$, respectively, and may be used to connect local bit lines $LBL_{11}$-$LBL_{31}$ to global bit lines $GBL_1$-$GBL_3$, respectively, using row select line $SG_1$. In particular, each of bit line select transistors $Q_{11}$-$Q_{31}$ has a first terminal (e.g., a drain/source terminal) coupled to a corresponding one of local bit lines $LBL_{11}$-$LBL_{31}$, respectively, a second terminal (e.g., a source/drain terminal) coupled to a corresponding one of global bit lines $GBL_1$-$GBL_3$, respectively, and a third terminal (e.g., a gate terminal) coupled to row select line $SG_1$.

Similarly, bit line select transistors $Q_{12}$-$Q_{32}$ are associated with local bit lines $LBL_{12}$-$LBL_{32}$, respectively, and may be used to connect local bit lines $LBL_{12}$-$LBL_{32}$ to global bit lines $GBL_1$-$GBL_3$, respectively, using row select line $SG_2$. In particular, each of bit line select transistors $Q_{12}$-$Q_{32}$ has a first terminal (e.g., a drain/source terminal) coupled to a corresponding one of local bit lines $LBL_{12}$-$LBL_{32}$, respectively, a second terminal (e.g., a source/drain terminal) coupled to a corresponding one of global bit lines $GBL_1$-$GBL_3$, respectively, and a third terminal (e.g., a gate terminal) coupled to row select line $SG_2$.

Likewise, bit line select transistors $Q_{13}$-$Q_{33}$ are associated with local bit lines $LBL_{13}$-$LBL_{33}$, respectively, and may be used to connect local bit lines $LBL_{13}$-$LBL_{33}$ to global bit lines $GBL_1$-$GBL_3$, respectively, using row select line $SG_3$. In particular, each of bit line select transistors $Q_{13}$-$Q_{33}$ has a first terminal (e.g., a drain/source terminal) coupled to a corresponding one of local bit lines $LBL_{13}$-$LBL_{33}$, respectively, a second terminal (e.g., a source/drain terminal) coupled to a corresponding one of global bit lines $GBL_1$-$GBL_3$, respectively, and a third terminal (e.g., a gate terminal) coupled to row select line $SG_3$.

Because a single bit line select transistor is associated with a corresponding local bit line, the voltage of a particular global bit line may be selectively applied to a corresponding local bit line. Therefore, when a first set of local bit lines (e.g., $LBL_{11}$-$LBL_{31}$) is biased to global bit lines $GBL_1$-$GBL_3$, the other local bit lines (e.g., $LBL_{12}$-$LBL_{32}$ and $LBL_{13}$-$LBL_{33}$) must either also be driven to the same global bit lines $GBL_1$-$GBL_3$ or be floated.

In an embodiment, during a memory operation, all local bit lines within the memory array are first biased to an unselected bit line voltage by connecting each of the global bit lines to one or more local bit lines. After the local bit lines are biased to the unselected bit line voltage, then only a first set of local bit lines $LBL_{11}$-$LBL_{31}$ are biased to one or more selected bit line voltages via the global bit lines $GBL_1$-$GBL_3$, while the other local bit lines (e.g., $LBL_{12}$-$LBL_{32}$ and $LBL_{13}$-$LBL_{33}$) are floated. The one or more selected bit line voltages may correspond with, for example, one or more read voltages during a read operation or one or more programming voltages during a programming operation.

In an embodiment, a vertical bit line memory array, such as memory array 200, includes a greater number of memory cells along the word lines as compared with the number of memory cells along the vertical bit lines (e.g., the number of memory cells along a word line may be more than 10 times the number of memory cells along a bit line). In one example, the number of memory cells along each bit line may be 16 or 32, whereas the number of memory cells along each word line may be 2048 or more than 4096. Other numbers of memory cells along each bit line and along each word line may be used.

In an embodiment of a read operation, the data stored in a selected memory cell (e.g., memory cell $M_{111}$) may be read by biasing the word line connected to the selected memory cell (e.g., selected word line $WL_{10}$) to a selected word line voltage in read mode (e.g., 0V). The local bit line (e.g., $LBL_{11}$) coupled to the selected memory cell ($M_{111}$) is biased to a selected bit line voltage in read mode (e.g., 1 V) via the associated bit line select transistor (e.g., $Q_{11}$) coupled to the selected local bit line ($LBL_{11}$), and the global bit line (e.g., $GBL_1$) coupled to the bit line select transistor ($Q_{11}$). A sense amplifier may then be coupled to the selected local bit line ($LBL_{11}$) to determine a read current TREAD of the selected memory cell (Mill). The read current $I_{READ}$ is conducted by the bit line select transistor $Q_{11}$, and may be between about 100 nA and about 500 nA, although other read currents may be used.

In an embodiment of a write operation, data may be written to a selected memory cell (e.g., memory cell $M_{221}$) by biasing the word line connected to the selected memory cell (e.g., $WL_{20}$) to a selected word line voltage in write mode (e.g., 5V). The local bit line (e.g., $LBL_{21}$) coupled to the selected memory cell ($M_{221}$) is biased to a selected bit line voltage in write mode (e.g., 0 V) via the associated bit line select transistor (e.g., $Q_{21}$) coupled to the selected local bit line ($LBL_{21}$), and the global bit line (e.g., $GBL_2$) coupled to the bit line select transistor ($Q_{21}$). During a write operation, a programming current $I_{PGRM}$ is conducted by the associated bit line select transistor $Q_{21}$, and may be between about 3 uA and about 6 uA, although other programming currents may be used.

During the write operation described above, the word line (e.g., $WL_{20}$) connected to the selected memory cell ($M_{221}$) may be referred to as a "selected word line," and the local bit line (e.g., $LBL_{21}$) coupled to the selected memory cell ($M_{221}$) may be referred to as the "selected local bit line." All other word lines coupled to unselected memory cells may be referred to as "unselected word lines," and all other local bit lines coupled to unselected memory cells may be referred to as "unselected local bit lines." For example, if memory cell $M_{221}$ is the only selected memory cell in memory array 200, word lines $WL_{10}$-$WL_{13}$ and $WL_{21}$-$WL_{23}$ are unselected word lines, and local bit lines $LBL_{11}$, $LBL_{31}$, $LBL_{12}$-$LBL_{32}$, and $LBL_{13}$-$LBL_{33}$ are unselected local bit lines.

Figure 2B:
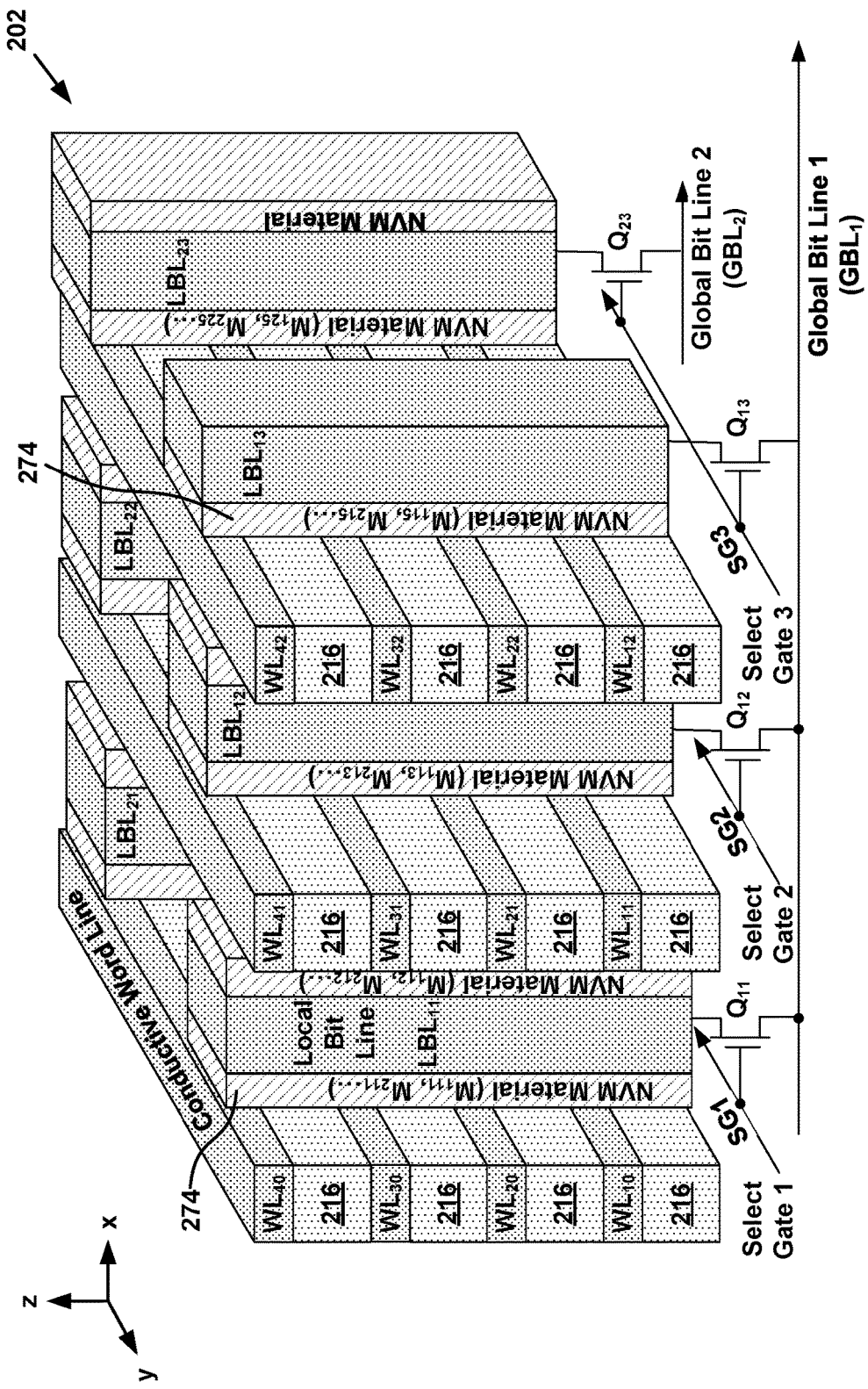
FIG. 2B depicts an embodiment of a portion of a monolithic three-dimensional memory array that includes vertical strips of a non-volatile memory material.

FIG. 2B depicts an embodiment of a portion of a monolithic three-dimensional memory array 202 that includes vertical strips of a non-volatile memory material. The portion of monolithic three-dimensional memory array 202 depicted in FIG. 2B may include an implementation for a portion of the monolithic three-dimensional memory array 200 depicted in FIG. 2A.

Monolithic three-dimensional memory array 202 includes word lines $WL_{10}$, $WL_{11}$, $WL_{12}$, ..., $WL_{42}$ that are formed in a first direction (e.g., an x-direction), vertical bit lines $LBL_{11}$, $LBL_{12}$, $LBL_{13}$, ..., $LBL_{23}$ that are formed in a second direction perpendicular to the first direction (e.g., a z-direction), and vertical strips of non-volatile memory material 274 formed in the second direction (e.g., the z-direction). A spacer 216 made of a dielectric material (e.g., silicon dioxide, silicon nitride, or other dielectric material) is disposed between adjacent word lines $WL_{10}$, $WL_{11}$, $WL_{12}$, ..., $WL_{42}$.

Each vertical strip of non-volatile memory material 274 may include, for example, a vertical oxide material, a vertical reversible resistance-switching memory material (e.g., one or more metal oxide layers such as nickel oxide, hafnium oxide, or other similar metal oxide materials, a phase change material, a barrier modulated switching structure or other similar reversible resistance-switching memory material), a ferroelectric material, or other non-volatile memory material.

Each vertical strip of non-volatile memory material 274 may include a single material layer or multiple material layers. In an embodiment, each vertical strip of non-volatile memory material 274 includes a vertical barrier modulated switching structure. Example barrier modulated switching structures include a semiconductor material layer adjacent a conductive oxide material layer (e.g., an amorphous silicon layer adjacent a titanium oxide layer). Other example barrier modulated switching structures include a barrier material disposed between the semiconductor material layer and the conductive oxide material layer (e.g., an aluminum oxide layer disposed between an amorphous silicon layer and a titanium oxide layer). Such multi-layer embodiments may be used to form BMC memory elements.

In an embodiment, each vertical strip of non-volatile memory material 274 may include a single continuous layer of material that may be used by a plurality of memory cells or devices.

In an embodiment, portions of the vertical strip of the non-volatile memory material 274 may include a part of a first memory cell associated with the cross section between $WL_{12}$ and $LBL_{13}$ and a part of a second memory cell associated with the cross section between $WL_{22}$ and $LBL_{13}$. In some cases, a vertical bit line, such as $LBL_{13}$, may include a vertical structure (e.g., a rectangular prism, a cylinder, or a pillar) and the non-volatile material may completely or partially surround the vertical structure (e.g., a conformal layer of phase change material surrounding the sides of the vertical structure).

As depicted, each of the vertical bit lines $LBL_{11}$, $LBL_{12}$, $LBL_{13}$, ..., $LBL_{23}$ may be connected to one of a set of global bit lines via an associated vertically-oriented bit line select transistor (e.g., $Q_{11}$, $Q_{12}$, $Q_{13}$, $Q_{23}$). Each vertically-oriented bit line select transistor may include a MOS device (e.g., an NMOS device) or a vertical thin-film transistor (TFT).

In an embodiment, each vertically-oriented bit line select transistor is a vertically-oriented pillar-shaped TFT coupled between an associated local bit line pillar and a global bit line. In an embodiment, the vertically-oriented bit line select transistors are formed in a pillar select layer formed above a CMOS substrate, and a memory layer that includes multiple layers of word lines and memory elements is formed above the pillar select layer.

Figure 3:
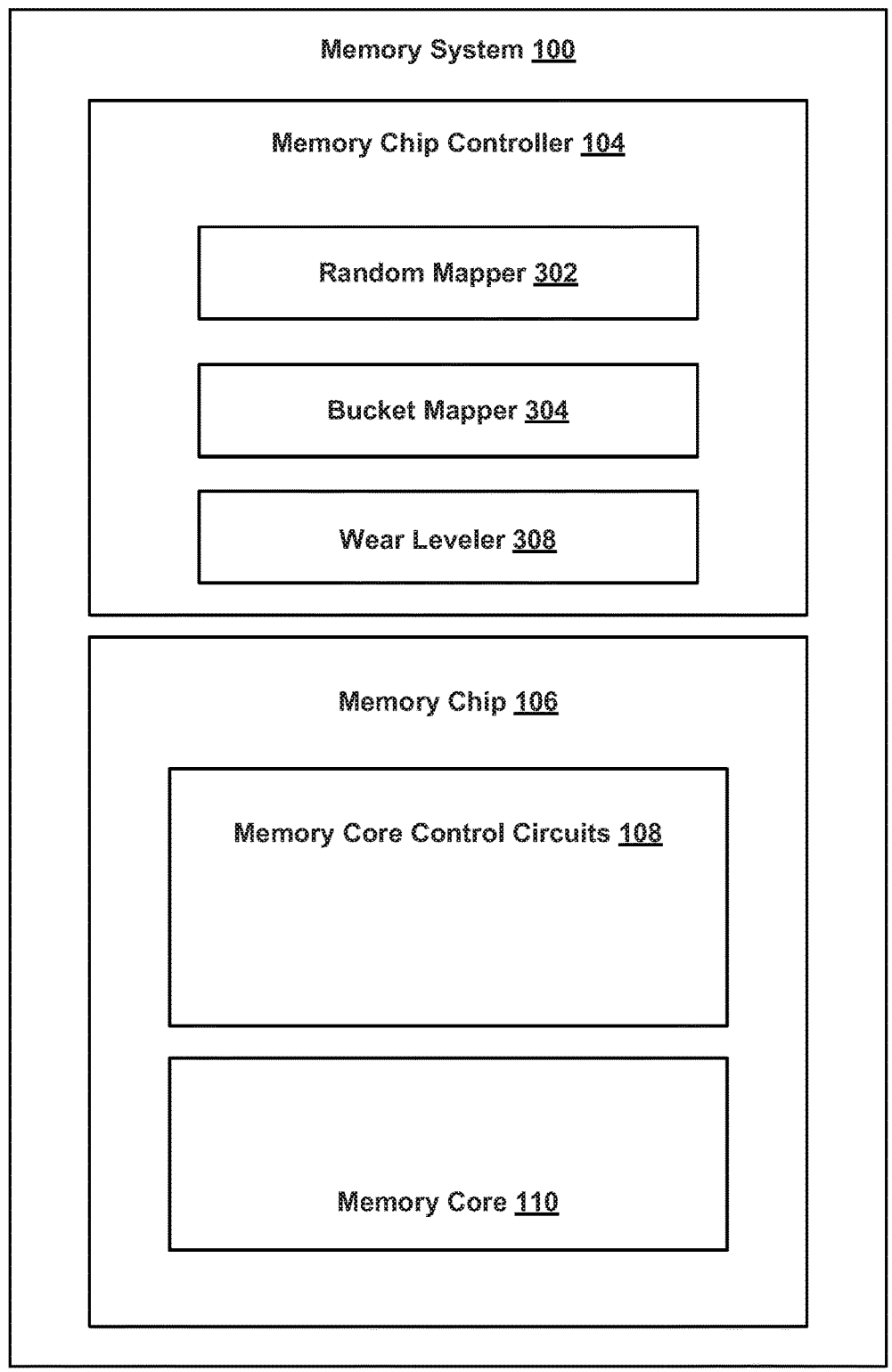
FIG. 3 is a diagram of one embodiment of a non-volatile memory system.

FIG. 3 is a diagram of one embodiment of a non-volatile memory system 100. The memory chip controller 104 has a random mapper 302, a bucket mapper 304, and a wear leveler 308.

The random mapper 302 may be configured to perform a random mapping from one address space to another address space. The term "random mapping" as used herein includes pseudo-random mapping. In one embodiment, the random mapper 302 is used to map logical addresses to intermediate addresses. The random mapper 302 performs a one-to-one mapping from logical addresses to intermediate addresses, in one embodiment. In one embodiment, the random mapper 302 performs pseudo-random permutations to map the addresses. The pseudo-random permutations of one embodiment are adversarially secure. The random mapper 302 of one embodiment uses transpositions based on block ciphers to map the addresses.

The random mapper 302 performs an algebraic mapping from logical addresses to intermediate addresses, in one embodiment. An algebraic mapping refers to a mapping that is based on a mathematical expression or equation in which a finite number of symbols are combined using mathematical operations, such as addition, subtraction, multiplication, division, and exponentiation. Note that the implementation of the algebraic mapping could be in hardware or software. In one embodiment, the random mapper 302 performs a pseudo-random algebraic mapping from logical addresses to intermediate addresses.

The random mapper 302 performs a memory-less addresses mapping from logical addresses to intermediate addresses, in one embodiment. A memory-less addresses mapping, as defined herein, means that memory is not needed to store the mapping from the logical addresses to intermediate addresses. With memory-less mapping, a particular logical addresses may be consistently mapped to the same intermediate address without the need to access a stored mapping from logical addresses to intermediate addresses. Thus, memory-less mapping does not need, for example, a mapping table of logical addresses to intermediate addresses. An algebraic address mapping is one example of a memory-less address mapping.

In one embodiment, the random mapper 302 is configured to periodically change the mapping from logical addresses to intermediate addresses. Herein, the term "epoch" is used to define a period in which the mapping from logical addresses to intermediate addresses is static. However, from one epoch to the next, the random mapper 302 changes the mapping from logical addresses to intermediate addresses, in one embodiment. In one embodiment, the random mapper 302 changes one or more parameters used to perform random mapping to change the mapping from one epoch to the next epoch. In one embodiment, the random mapper 302 changes one or more parameters used in an algebraic mapping to change the mapping from one epoch to the next epoch.

The bucket mapper 304 is configured to partition a physical address space of the memory core 110 into a number of buckets, in one embodiment. The physical address space contains a range of physical addresses, with each physical address specifying a set of one or more memory cells. In one embodiment, the physical addresses are specified by physical pages. A physical page is defined in this context as a basic unit of writing. The physical page could be any size.

A bucket is a set of physical addresses. In one embodiment, the set of physical addresses for a bucket are consecutive addresses. However, it is not required that the physical addresses in a bucket be consecutive. In one embodiment, each of the physical addresses for a given bucket is eligible to contain valid data at the same time. This allows the entire physical address space to be used to store data, in one embodiment. The bucket mapper 304 is configured to map intermediate addresses to physical addresses, in one embodiment. Thus, the bucket mapper 304 may be configured to map an intermediate address to one of the buckets.

In one embodiment, the bucket mapper 304 manages a set of pointers for each bucket. In one embodiment, there are two pointers per bucket. Briefly, one pointer may identify which cycle of a pre-determined number of rotation cycles have been applied. A second pointer may identity a position in the bucket. The pointers may be stored in any non-transitory storage. In one embodiment, a copy of the pointers are stored in RAM 215 during operation. A copy of the pointers may be persisted in non-volatile memory 106. Further details of embodiments of the pointers are discussed below.

The wear leveler 308 is configured to perform wear leveling. In one embodiment, wear leveler 308 performs wear leveling within the buckets. In one embodiment, wear leveler 308 moves data from one bucket to another bucket responsive to a change in the mapping from logical address to intermediate address. The wear leveler 308 is able to extend the life of the memory core 110 even if the memory core is subject to adversarial attacks, such as a multitude of writes to the same logical address.

The components of controller 104 depicted in FIG. 3 may take the form of a packaged functional hardware unit (e.g., an electrical circuit) designed for use with other components, a portion of a program code (e.g., software or firmware) executable by a (micro) processor or processing circuitry that usually performs a particular function of related functions, or a self-contained hardware or software component that interfaces with a larger system, for example. For example, the random mapper 302, the bucket mapper 304, and/or the wear leveler 308 may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, the random mapper 302, the bucket mapper 304, and/or the wear leveler 308 may include software stored in a processor readable device (e.g., memory) to program a processor for controller 104 to perform the functions described herein. The architecture depicted in FIG. 3 is one example implementation that may (or may not) use the components of controller 104 depicted in FIG. 1G.

FIG. 4A depicts a curve to show an endurance problem for a memory device under an adversarial attack. The vertical axis represents the number of writes to each block of the memory device. Thus, note that the unit of write in this example is a block, but the unit of write is not required to be a block. The horizontal axis represents the blocks. The blocks are distributed on the horizontal axis from a least written block to a most written block. Line 402 represents a maximum possible endurance for a block in terms of number of writes. For example, line 402 might represent 1 million writes to a block. A memory device fail condition is defined in this example as when one percent of the blocks exceed the endurance limit 402. This is labeled as "1% dead blocks" in FIG. 4B.

The maximum possible utilization of the memory device would be for all of the blocks to be used up to the endurance limit 402. However, in real world applications some blocks will be written to more frequently than others. Moreover, if the memory device is under adversarial attack in which the same logical block is written to repeatedly some blocks might not be written very many times, even if a conventional wear-leveling algorithm is used. Curve 404 represents the number or writes to the blocks on the horizontal axis. Curve 404 shows that a high percentage of the blocks are written to far less than the endurance limit 402. Hence, the memory device fails well below the maximum endurance if all blocks were written to the endurance limit 402. Note that the area under curve 404 represents the total utilization of the blocks.

FIG. 4B is graph to show how endurance can be improved for one embodiment of a memory device under an adversarial attack. Curve 406 represents the number or writes for blocks on the horizontal axis. Curve 406 is for at a time when one percent of the blocks are marked dead because their number of writes has exceeded the endurance limit 402. The utilization of the blocks on curve 406 is much greater than the utilization of the blocks on curve 404. This can be observed by the larger area under curve 406 than curve 404. In other words, the blocks in FIG. 4B have received more total writes then the blocks in FIG. 4A. Thus, the embodiment of the memory device under an adversarial attack has improved endurance. In some embodiments, endurance is improved by being effective at spreading out writes to the same logical address to different physical addresses. Further details of spreading out the writes are described below. Note that the foregoing also applies if the adversarial attack targets a small set of logical addresses. Also, even if there is not an adversarial attack, endurance may be improved by embodiments of memory devices. Also note that embodiments of memory devices may provide greater endurance than depicted in FIG. 4B.

Figure 5:
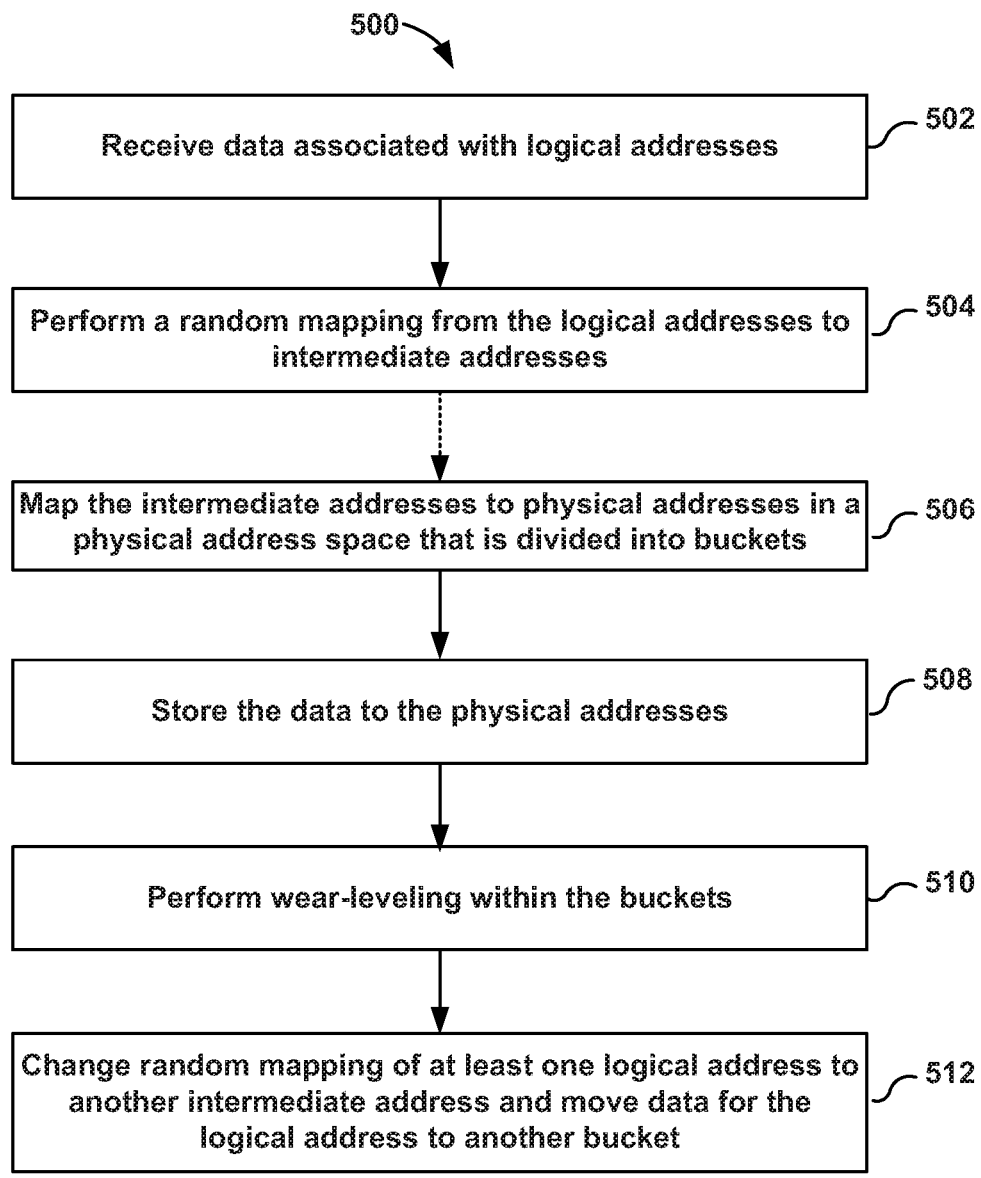
FIG. 5 is a flowchart of one embodiment of a process 500 of operating non-volatile storage.

FIG. 5 is a flowchart of one embodiment of a process 500 of operating non-volatile storage. The process 500 may be performed in memory system 100 of FIG. 1A or 3, as examples. In one embodiment, process 500 is performed by one or more managing or control circuits. The one or more managing or control circuits may include any one of or a combination of control circuitry, state machine, decoders, sense amplifiers, read/write circuits, and/or controllers. In one embodiment, process 500 is performed by one or more of random mapper 302, bucket mapper 304, wear leveler 308, and/or read/write circuit 146.

Step 502 includes receiving data associated with logical addresses. In one embodiment, the controller 104 receives commands from a host. The commands are received by front end module 208, in one embodiment. The commands may specify logical block addresses. Note that to receive the data the controller 104 could perform a direct memory access (DMA) to access the data from host memory.

Step 504 includes performing a random mapping from the logical addresses to intermediate addresses. In one embodiment, random mapper 302 performs step 504. The random mapping includes pseudo-random mapping.

In one embodiment, the random mapping from the logical addresses to intermediate addresses is memory-less. As noted above, with memory-less mapping, a particular logical addresses may be consistently mapped to the same intermediate address without the need to store a previously determined mapping from the logical addresses to the intermediate addresses. Thus, memory-less mapping does not need, for example, a mapping table of logical addresses to intermediate addresses.

In one embodiment, the random mapping from the logical addresses to intermediate addresses is an algebraic mapping. As stated above, an algebraic mapping refers to a mapping that is based on a mathematical expression or equation in which a finite number of symbols are combined using mathematical operations, such as addition, subtraction, multiplication, division, and exponentiation. Note that the algebraic mapping could be performed in hardware or software.

Step 506 includes mapping the intermediate addresses to physical addresses in a physical address space that is divided into buckets. Note that step 506 may result in a mapping of logical addresses to physical addresses. Each of the logical addresses may map to one physical address. In one embodiment, step 506 includes management of two pointers for each bucket. Each pointer may be stored in volatile memory (e.g., RAM 206) in the controller 104 for low latency. Moreover, the pointers do not require much storage space. Further details of managing pointers for buckets are described below. In one embodiment, bucket mapper 304 performs step 506.

Figure 6A:
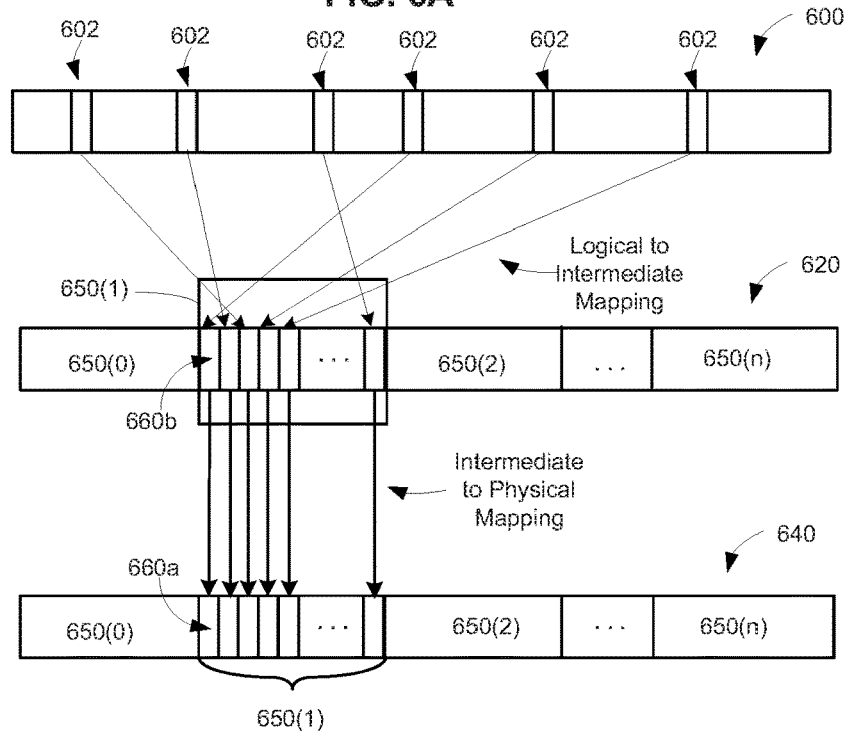
FIG. 6A is a diagram that illustrates one embodiment of steps 502-506 of process 500.

FIG. 6A is a diagram that illustrates one embodiment of steps 502-506. The diagram is divided into three type of addresses. On top are logical addresses in a logical address space 600. In the middle are intermediate addresses in an intermediate address space 620. At the bottom are physical addresses in a physical address space 640. In one embodiment, the intermediate address space 620 and the physical address space 640 are the same size.

Figure 6B:
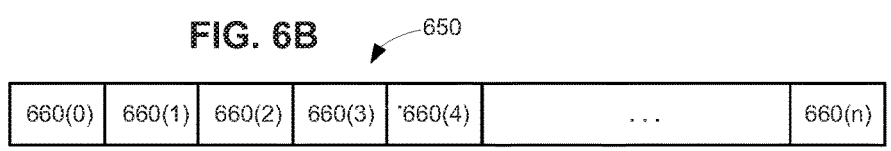
FIG. 6B shows further details of one of the buckets in FIG. 6A.

The physical address space 640 is divided into a number of buckets 650(0) to 650(n). FIG. 6B shows further details of one of the buckets 650. The bucket 650 has a number of positions 660(0) to 660(n). Each of the positions 660 corresponds to a unique physical address in memory core 110. As one example, each position corresponds to a physical block address (PBA). For comparison, FIG. 6A has reference number 660a pointing to one position in bucket 650(1) in physical address space 640.

Note that the intermediate address space 620 can also be considered to be divided into the same number and size of buckets 650 as the physical address space 640. Reference number 660b points to one position in bucket 650(1) in intermediate address space 620, which corresponds to position 600a in bucket 650(1) in the physical address space 640.

Referring again to FIG. 6A, a number of logical addresses 602 are referenced in a logical address space 600. These logical addresses 602 represent some of the logical addresses that might be received in step 502. For simplicity, just a few logical addresses 602 are referenced. The logical addresses are logical block addresses, in one embodiment.

Each of the logical addresses 602 is randomly mapped to one intermediate address, in one embodiment. FIG. 6A depicts some of the mapping that might be performed in step 504. Each of the intermediate addresses is in one of the buckets 650(1). Moreover, note that the random mapping places each of the intermediate addresses to one of the positions 660 in the bucket 650(1). For the sake of illustration, only intermediate addresses that correspond to bucket 650(1) are shown. Note, however, that the mapping from logical addresses to intermediate addresses is random, in one embodiment. Hence, the intermediate addresses may be spread randomly across the intermediate address space 620.

FIG. 6A also depicts a mapping from intermediate addresses to physical addresses. In FIG. 6A, a default mapping is depicted in which each intermediate address is at the same position in the bucket in both the intermediate address space 620 and the physical address space 640. In the default mapping the pointers for the bucket may be set to an initial position in which there is no translation of the intermediate addresses to a different position 660 in the physical address space 640 that the logical address points to in the intermediate address space 620. Hence, by default the physical address may be equal to the intermediate address. The mapping from intermediate addresses to physical addresses represents some of the mapping that might be performed in step 506.

Step 508 includes storing the data associated with the logical addresses to the physical addresses. In one embodiment, read/write circuit 146 stores the data to the physical addresses to which the logical addresses are initially mapped. Note that the mapping between logical address and physical address is changed from time to time, in accordance with embodiments. In one embodiment, one page of data is written for each address.

Figure 6C:
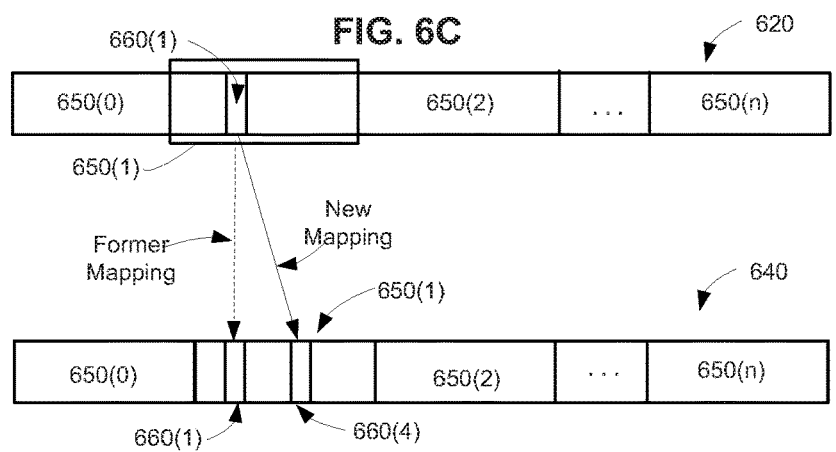
FIG. 6C depicts an example an intermediate addresses being mapped to a new position in the same bucket.

Step 510 includes performing wear-leveling within the buckets that receive data. Step 510 may include changing the mapping of intermediate addresses within a bucket from present physical addresses to new physical addresses within the same bucket. Note that this change effectively changes the mapping of logical address to physical address. Bucket mapper 304 may change the mapping. FIG. 6C depicts an example of one of the intermediate addresses in bucket 650(1) being mapped from one position 660(1) in bucket 650(1) to a new position 660(4) in the same bucket 650(1).

Step 510 also includes moving the data at the physical address for position 660(1) to the physical address for position 660(4). In one embodiment, step 510 include swapping data between two physical addresses. For example, the data at the physical address for position 660(4) may be moved to the physical address for position 660(1). Wear leveler 308 may move the data.

Step 512 includes changing the random mapping of at least one of the logical address to another intermediate address. Random mapper 302 may change the mapping. Note that this change may effectively change the mapping of logical address to physical address. Step 512 further includes moving the data for the logical address to another bucket. Wear leveler 308 may move the data. Thus, step 512 may provide for additional wear-leveling.

In some embodiments, the mapping from logical addresses to intermediate addresses changes from one period to the next period. These periods may be called epochs. A new epoch may start based on a certain number of writes to the memory, or some other measure.

Figure 7A:
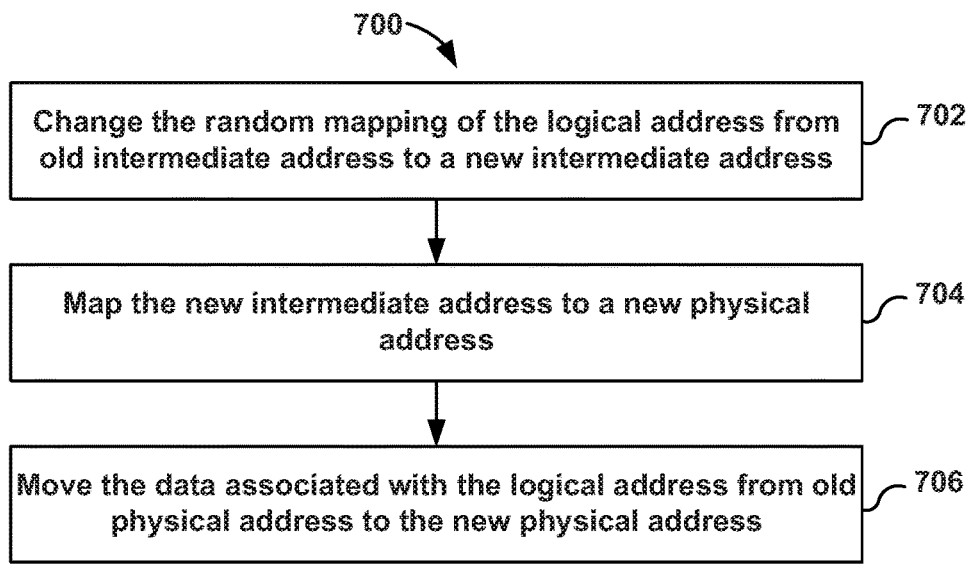
FIG. 7A is a flowchart of one embodiment of a process of changing a mapping of a logical address from one intermediate address to another intermediate address.

FIG. 7A is a flowchart of one embodiment of a process 700 of changing a mapping of a logical address from one intermediate address to another intermediate address. Note that for simplicity, process 700 discusses re-mapping of just one of the logical addresses. However, the process 700 may be performed on many logical addresses. Process 700 provides further details of one embodiment of step 512. Process 700 will be discussed with reference to the diagram of FIG. 7B, which depicts one embodiment of changing a mapping of a logical address from one intermediate address to another intermediate address.

The process 700 may be performed in memory system 100 of FIG. 1A or 3, as examples. In one embodiment, process 700 is performed by one or more managing or control circuits. The one or more managing or control circuits may include any one of or a combination of control circuitry, state machine, decoders, sense amplifiers, read/write circuits, and/or controllers. In one embodiment, process 700 is performed by one or more of random mapper 302, bucket mapper 304, wear leveler 308, and/or read/write circuit 146.

Step 702 includes changing the random mapping of the logical address from the old intermediate address to a new intermediate address. In one embodiment, random mapper 302 performs step 702. In one embodiment, random mapper 302 changes one or more parameters in the random mapping in order to change the mapping.

Figure 7B:
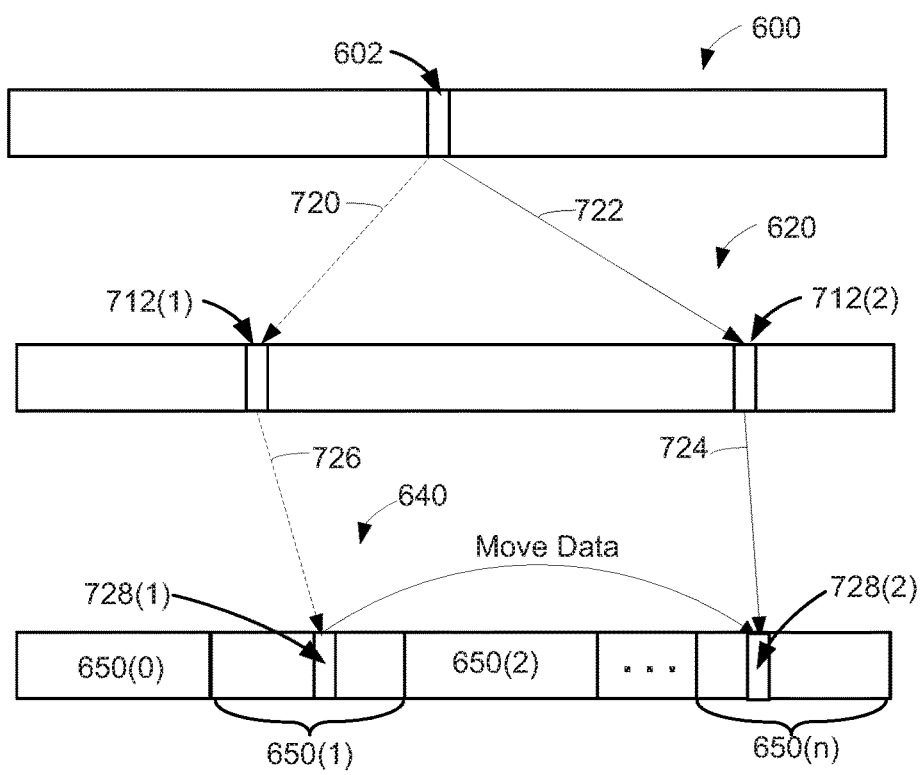
FIG. 7B depicts one embodiment of changing a mapping of a logical address from one intermediate address to another intermediate address.

Note that the new intermediate address may be associated with a different bucket than the old intermediate address. However, since the mapping may be random, it is not guaranteed that the new intermediate address will be associated with a different bucket than the old intermediate address. With reference to FIG. 7B, arrow 720 shows the mapping from the logical address 602 to the old intermediate address 712(1); arrow 722 shows the mapping from the logical address 602 to the new intermediate address 712(2).

Step 704 includes mapping the new intermediate address to a physical address. Bucket mapper 304 may perform step 704. FIG. 7B shows arrow 724 to depict the mapping of the new intermediate address 712(2) to the new physical address 728(2). Note that this is equivalent to mapping the new intermediate address 712(2) to a position 660 in the new bucket 650(n).

Step 706 includes moving data associated with the logical address from the old physical address to the new physical address. This is represented by the arrow labelled "move data." After moving the data, the mapping from the old intermediate address to the old physical address 728(1) could be deleted. Wear leveler 308 may perform step 706.

Note that process 700 may be performed for many logical addresses. Thus, there can be a considerable random shuffling of data between the buckets. In one embodiment, the random mapping from logical addresses to intermediate addresses is static during an epoch. Step 510 of process 500 may be performed during an epoch to wear level within an epoch. The wear leveling within buckets helps to prevent excessive memory cell wear between epochs in which the logical address to intermediate address mapping is changed.

Figure 8:
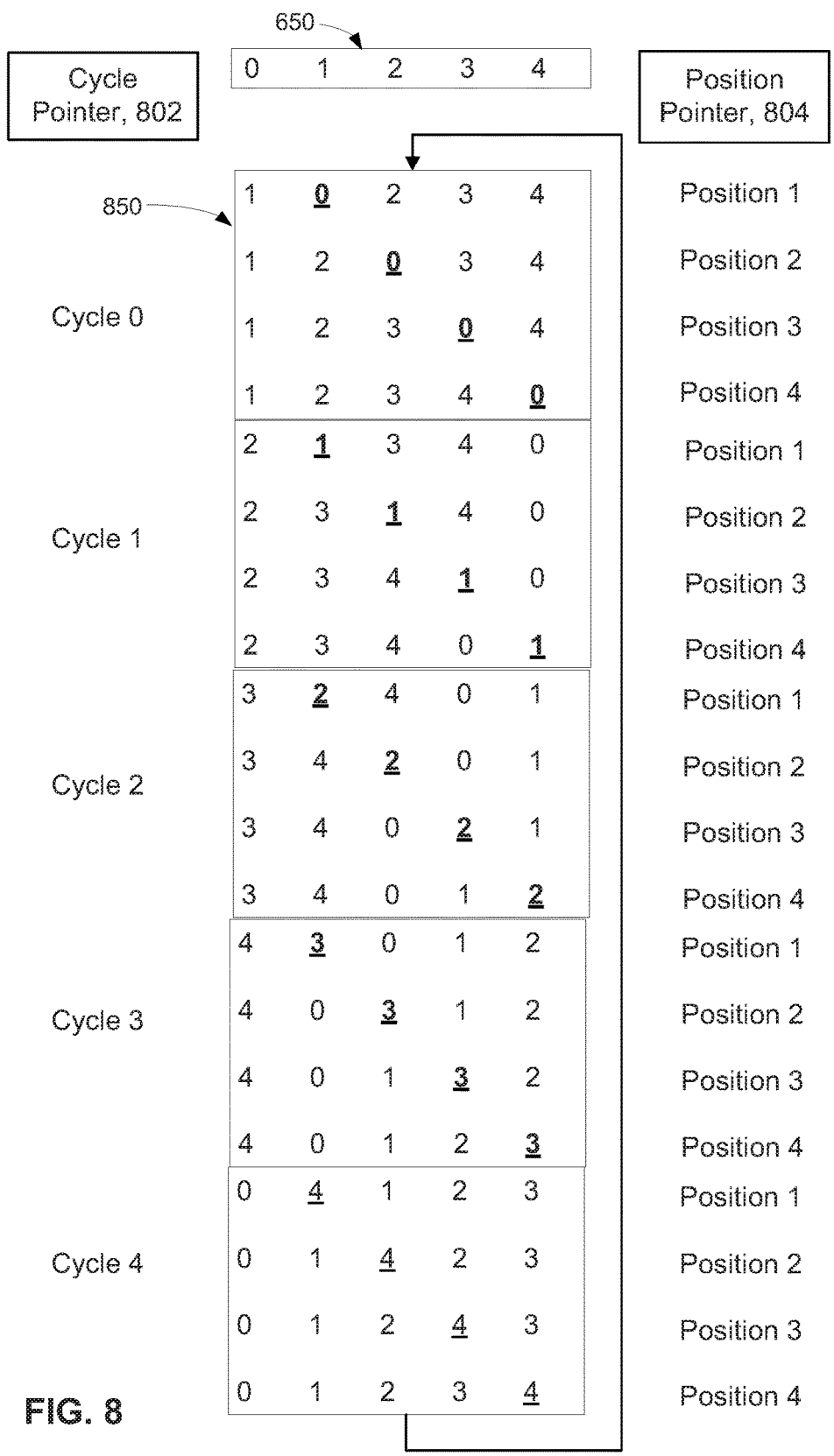
FIG. 8 is a diagram to illustrate how data may be rotated within a bucket, in one embodiment.

FIG. 8 is a diagram to illustrate how data may be rotated within a bucket 650, in one embodiment. This rotation may be used to perform wear leveling in step 510 of process 500. The bucket has five positions (0 to 4), in this example. As noted above, each position corresponds to a unique physical address. There are no empty spaces in the bucket, in this embodiment. In other words, all positions are eligible to store valid data concurrently. For the sake of example, it will be assumed that there is valid data stored at all five physical addresses, although it is not required that all physical addresses contain valid data.

There is a cycle pointer 802 and a position pointer 804 associated with this bucket 650. Structure 850 shows how the data stored in the bucket 650 may be rotated. Structure 850 is divided into five cycles. The cycle pointer 802 contains the present cycle number. There are four swaps in each cycle, with the swaps being defined by one of four positions. The position pointer 804 points to a position. Note that only four positions are specified (Position 1 to Position 4). The structure 850 highlights the present position in bold underscore. Note that Position 0 does not need to ever be specified by the position pointer 804. Each row in structure 850 represents one swap. A swap includes swapping data stored at one physical address with data stored at another physical address. Also note that the structure 850 defines a present state of where the data in the bucket 650 has moved to. In other words, the combination of the cycle pointer 802 and the position pointer 804 uniquely define where the data has been moved to.

The first swap is depicted by the condition when the cycle pointer 802 is 0 and the position pointer 804 is 1. Note that the top row in structure 850 shows positions 0 and 1 in have swapped relative to the default positions. Thus, the data at the physical address for position 1 is moved to the physical address for position 0, and the data at the physical address for position 0 is moved to the physical address for position 1.

Note that the setting the cycle pointer 802 and the position pointer 804 effectively creates a mapping from intermediate address to physical address. For example, the intermediate address that was pointing to position 0, now points to position 1. Also, the intermediate address that was pointing to position 1, now points to position 0.

The second swap is depicted by the second row in structure 850. For the second row the cycle pointer is still 0, but the position pointer is now 2. Note that positions 1 and 2 (referring to positions in the bucket 650) are swapped going from the top row to the second row. This refers to swapping the data at the physical addresses for positions 1 and 2 in the bucket 650. Note that this means that the intermediate address that was originally pointing to position 0, now points to position 2. Also, the intermediate address that was originally pointing to position 2, now points to position 1. This may be understood by comparing the positions in the bucket 650, with the positions in the second row of structure 850.

The swapping process may proceed in a similar manner for other rows in structure 850 (moving downward in structure 850). At the end of cycle 0, the data that was at position 0, has now moved to position 4. The data at every other position has moved to one position lower in the bucket 650. Thus, this cycle has effectively rotated the data one position to the left (with the lowest position moving around to the other side). A similar rotation occurs with each cycle. At the end of cycle 4, note that the data has returned to its original position it was in. After cycle 4, the next swap returns to the top row of cycle 0.

Note that the example in FIG. 8 is just one way to rotate data within a bucket 650. In the example in FIG. 8, the data swaps are between adjacent positions in a bucket 650. In another embodiment, the data swaps are between non-adjacent positions in a bucket 650. In the example in FIG. 8, the number of cycles is equal to the number of positions in the bucket 650. In another embodiment, the number of cycles is not equal to the number of positions in the bucket 650. In one embodiment, the number of cycles is less than the number of positions in the bucket 650.

Figure 9:
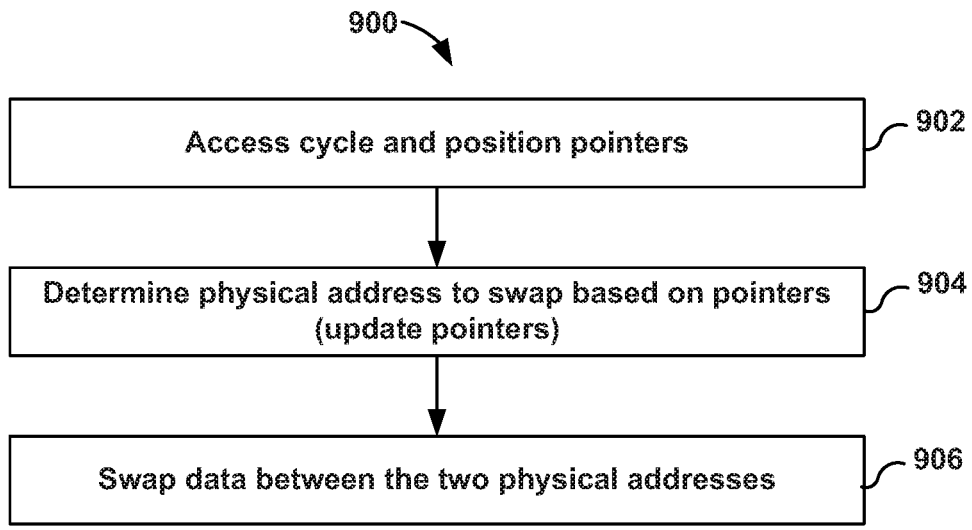
FIG. 9 is a flowchart of one embodiment of a process of wear leveling within a bucket.

FIG. 9 is a flowchart of one embodiment of a process 900 of wear leveling within a bucket 650. In process 900 data is rotated with a bucket 650, as in the example of FIG. 8. Process 900 is one embodiment of step 510. The process 900 may be performed in memory system 100 of FIG. 1A or 3, as examples. In one embodiment, process 900 is performed by one or more managing or control circuits. The one or more managing or control circuits may include any one of or a combination of control circuitry, state machine, decoders, sense amplifiers, read/write circuits, and/or controllers. In one embodiment, process 900 is performed by one or more of random mapper 302, bucket mapper 304, wear leveler 308, and/or read/write circuit 146.

Step 902 includes accessing a cycle pointer 802 and a position pointer 804 for the bucket 650. For the sake of example, with reference to FIG. 8, the cycle pointer is 1 and the position pointer is 2.

Step 904 includes determining physical addresses for which to swap data based on the pointers 802, 804. In the present example, the position pointer may be incremented to 3. Since the cycle has not ended, there is no need to update the cycle pointer. The present example refers to the transition between the row [2, 3, 1, 4, 0] and the row [2, 3, 4, 1, 0] in FIG. 8. The change here is a swap between position 2 and position 3 (with reference to the positions in bucket 650). In other words, the physical addresses are those that correspond to position 2 and position 3 in the bucket 650.

Step 906 includes swapping data between the two physical addresses. Thus, the data at the physical address that corresponds to position 2 in the bucket 650 is moved to the physical address that corresponds to position 3 in the bucket 650. Also, the data at the physical address that corresponds to position 3 in the bucket 650 is moved to the physical address that corresponds to position 3 in the bucket 650.

Note that process 900 can be repeated for other swaps to wear level other sets of memory cells for the bucket 650. With reference to the example of FIG. 8, each cycle the data at every position is moved at least once. Hence, the process 900 could be repeated to assure that the data in all memory cells in the bucket 650 has been moved at least once.

Process 900 can be triggered by a variety of events. In one embodiment, the wear leveler 308 maintains a count of the number of writes to each bucket 650. When the count hits a threshold, the wear leveler 308 may trigger process 900. Also, once the count hits the threshold the wear leveler 308 could perform process 900 a set number of times. For example, the wear leveler 308 could perform one cycle with respect to an example such as, but not limited to FIG. 8. However, the set number of times that process 900 is performed, once triggered, does not need to be a complete cycle.

It is not required that a count be maintained to trigger process 900. In one embodiment, the wear leveler 308 triggers process 900 responsive to a stochastic determination with respect to the number writes to the physical addresses in the bucket 650. For example, each time there is a write to a physical addresses in the bucket 650, the wear leveler 308 may run a random (or pseudo random) probability generator, that is designed to produce a positive result once every "x" times. The wear leveler 308 then triggers process 900 responsive to the positive result, but not if there is a negative result. If "x" is equal to the count of the previous example, then process 900 will on average be trigger with the same frequency as maintaining the count.

Figure 10:
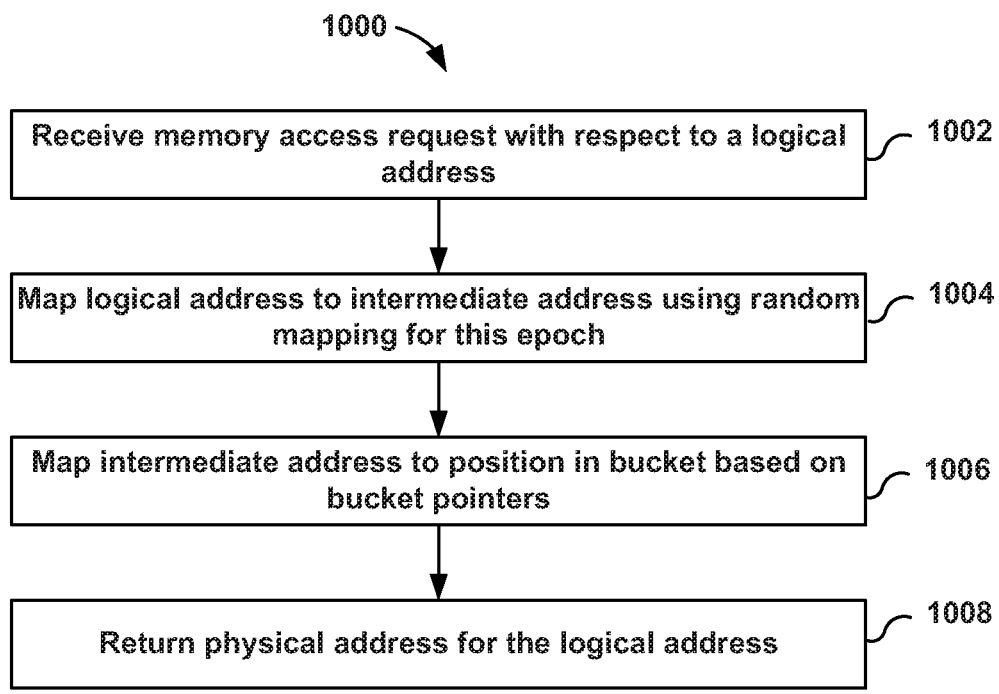
FIG. 10 is a flowchart of one embodiment of a process of returning a physical address for a logical address.

FIG. 10 is a flowchart of one embodiment of a process 1000 of returning a physical address for a logical address. This process 1000 may be performed in response to a memory access request such as a read or write to memory core 110. The process 1000 may be performed in memory system 100 of FIG. 1A or 3, as examples. In one embodiment, process 1000 is performed by one or more managing or control circuits. The one or more managing or control circuits may include any one of or a combination of control circuitry, state machine, decoders, sense amplifiers, read/ write circuits, and/or controllers. In one embodiment, process 1000 is performed by one or more of front end module 208, random mapper 302 and/or bucket mapper 304.

Step 1002 includes receiving a memory access request with respect to a logical address. As one example, controller 104 receives the memory access request from host. For example, front end module 208 receives the memory access request from host.

Step 1004 includes mapping the logical address to an intermediate address using the random mapping for this epoch. Step 1004 may be performed by random mapper 302. Note that the mapping may change each epoch. Thus, the random mapper 302 may track the epoch.

For the sake of example, the intermediate address is mapped to bucket 650(1) with reference to FIG. 6A. Also, for the sake of example, the intermediate address is mapped to position 660(2) with reference to FIG. 6B. Note that this is an initial position within the bucket, and not the final position within the bucket.

Step 1006 includes mapping the intermediate address to a position in a bucket based on bucket pointers 802, 804. An example will be discussed with respect to FIG. 8. It will be assumed that the intermediate address was initially mapped to position 2 in bucket 650. Further, it will be assumed that the cycle counter is 2 and the position counter is 3. With reference to the structure 850 in FIG. 8, it can be seen that the relative row reads [3, 4, 0, 2, 1]. This row indicates that the data for original position 2 is now at the physical address position 3. Stated another way, this row indicates that the original data was moved one place to the right.

Step 1008 is to return the physical address for the logical address. Thus, the physical address for position 3 in the bucket is returned. The physical address may be provided to back end module 210 in controller 104. Back end module 210 may then use the physical address to access non-volatile memory 106.

A first embodiment includes an apparatus, comprising: a plurality of non-volatile memory cells; a communication interface configured to receive data to store in the non-volatile memory cells. The data is associated with logical addresses. The apparatus further comprises a first mapper configured to perform a random mapping from the logical addresses to intermediate addresses in an intermediate address space. The first mapper is further configured to change the random mapping from the logical addresses to the intermediate addresses from a period to a next period. The apparatus includes a second mapper configured to map the intermediate addresses to physical addresses in a physical address space that is divided into a plurality of buckets. This results in the logical addresses being mapped to physical addresses. The apparatus includes a write circuit configured to store the data to the physical addresses to which the logical addresses are initially mapped. The apparatus includes a wear leveler configured to move data within buckets during a period responsive to the change in the mapping between the intermediate addresses to physical addresses. The wear leveler is further configured to move data from one bucket to another bucket responsive to the change of the mapping from the logical addresses to the intermediate addresses.

In a second embodiment, and in furtherance of the first embodiment, the second mapper is further configured to change the mapping of an intermediate address within a bucket from one physical address to another physical address within the same bucket to trigger wear leveling within a bucket.

In a third embodiment, and in furtherance of the first or second embodiments, during a first period a first of the logical addresses is mapped to a first intermediate address using a first random mapping. The first intermediate address is mapped to a first physical address in a first of the buckets during a first period. The data for the first logical address is stored at the first physical address during a first period. The first mapper is further configured to perform a second random mapping to cause the first logical address to map to a second intermediate address during a second period. The second mapper is further configured to map the second intermediate address to a second physical address in a second of the buckets during the second period. The wear leveler is further configured to move the data associated with the first logical address from the first physical address to the second physical address during the second period.

In a fourth embodiment, and in furtherance of the first or second embodiments, during a first period the logical addresses to the intermediate addresses are static. During the first period: a first set of the logical addresses are mapped to a first set of intermediate addresses, the first set of intermediate addresses are mapped to a first set of physical addresses in a first of the buckets, and the data for the first set of logical addresses is stored at the first set of physical addresses. The wear leveler is configured to rotate data within the first bucket, including storing valid data to all physical addresses associated with the first bucket.

In a fifth embodiment, and in furtherance of the first or second embodiments, during a first period: a first set of the logical addresses are mapped to a first set of intermediate addresses using a first algebraic mapping, the first set of intermediate addresses are mapped to a first set of physical addresses in a first of the buckets, and the data for the first set of logical addresses is stored at the first set of physical addresses. The first mapper is further configured to perform a second algebraic mapping to cause the first set of logical addresses to map to a second set of intermediate addresses during a second period. The second mapper is further configured to map the second set of intermediate addresses to a second set of physical addresses that are distributed in multiple ones of the buckets during the second period.

In a sixth embodiment, and in furtherance of any of the first through fifth embodiments, the wear leveler is further configured to swap the data at a first physical address in a first of the buckets with data at a second physical address in the first bucket.

In a seventh embodiment, and in furtherance of the sixth embodiment, the wear leveler is further configured to rotate the data in the first bucket for a pre-determined number of cycles, with each cycle moving data from one end of the first bucket to the other end of the first bucket, and sliding all other data one position in the bucket.

In an eighth embodiment, and in furtherance of the seventh embodiment, the wear leveler is further configured to maintain a first pointer to a position in the first bucket, and a second pointer to a cycle of the number of bucket rotations.

In a ninth embodiment, and in furtherance of any of the first through eighth embodiments, the wear leveler is further configured to perform wear leveling in a given bucket responsive to a stochastic determination with respect to the number writes to the physical addresses in the given bucket.

In a tenth embodiment, and in furtherance of any of the first through eighth embodiments, the wear leveler is further configured to perform wear leveling in a given bucket responsive to a count of the number writes to the physical addresses in the given bucket exceeding a threshold.

In an eleventh embodiment, and in furtherance of any of the first through tenth embodiments, the first mapper is further configured to repeat the random mapping from the logical addresses to the same intermediate addresses without consulting a stored mapping of the logical addresses to the intermediate addresses.

In a twelfth embodiment, and in furtherance of any of the first through eleventh embodiments, the random mapping is a memory-less mapping.

One embodiment includes a method of operating non-volatile storage, the method comprising: receiving data to write to the non-volatile storage having a physical address space that is divided into a plurality of buckets, the data being associated with logical addresses; performing a random mapping from the logical addresses to intermediate addresses; mapping the intermediate addresses to physical addresses in the physical address space. Thus, each logical address is mapped to one physical address. The method further comprises storing the data at the physical addresses to which the logical addresses are mapped; performing wear-leveling within buckets to which the data is stored; changing the random mapping of at least one of the logical addresses to a new intermediate address; changing the mapping of the new intermediate address from a first physical address in a first bucket to a second first physical address in a second bucket; and moving the data from the first physical address to the second physical address responsive to the changed mapping.

One embodiment includes a non-volatile storage device, comprising a plurality of non-volatile memory cells. The non-volatile storage device comprises communication means for receiving data to store in the non-volatile memory cells. The data being associated with logical addresses. The non-volatile storage device comprises first mapping means for performing a random mapping from the logical addresses to intermediate addresses. The first mapping means further for changing the random mapping from the logical addresses to the intermediate addresses from a period to a next period. The first mapping means further for changing the random mapping from the logical addresses to the intermediate addresses from a period to a next period. The non-volatile storage device comprises second mapping means for mapping the intermediate addresses to physical addresses in an address space that is divided into a plurality of buckets. The second mapping means is further for changing the mapping between intermediate addresses to physical addresses within a period. The non-volatile storage device comprises writing means for storing the received data to the physical addresses to which the logical addresses are initially mapped. The non-volatile storage device comprises wear leveling means for moving data within the buckets responsive to the second mapping means changing the mapping between intermediate addresses to physical addresses. The wear leveling means is further for moving data from one bucket to another bucket responsive to the change of the mapping from the logical addresses to the intermediate addresses from a period to a next period.

The first mapping means may include one or more of all or a portion of controller 104, random mapper 302, a packaged functional hardware unit (e.g., an electrical circuit) designed for use with other components, a portion of a program code (e.g., software or firmware) executable by a (micro) processor or processing circuitry that usually performs a particular function of related functions, or a self-contained hardware or software component that interfaces with a larger system, an application specific integrated circuit (ASIC), a Field Programmable Gate Array (FPGA), a circuit, a digital logic circuit, an analog circuit, a combination of discrete circuits, gates, or any other type of hardware or combination thereof.

The second mapping means may include one or more of all or a portion of controller 104, bucket mapper 304, a packaged functional hardware unit (e.g., an electrical circuit) designed for use with other components, a portion of a program code (e.g., software or firmware) executable by a (micro) processor or processing circuitry that usually performs a particular function of related functions, or a self-contained hardware or software component that interfaces with a larger system, an application specific integrated circuit (ASIC), a Field Programmable Gate Array (FPGA), a circuit, a digital logic circuit, an analog circuit, a combination of discrete circuits, gates, or any other type of hardware or combination thereof.

The writing means may include one or more of read/write circuit 146, address decoders 120, voltage generators for first control lines 122, voltage generators for second control lines 124, signal generator for reference signals 126, row decoders 152, column decoder 154, read/write circuits 146, state machine, sense amplifiers and/or other hardware or software.

The wear leveling means may include one or more of all or a portion of controller 104, wear leveler 308, read/write circuit 146, address decoders 120, voltage generators for first control lines 122, voltage generators for second control lines 124, signal generator for reference signals 126, row decoders 152, column decoder 154, read/write circuits 146, state machine, a packaged functional hardware unit (e.g., an electrical circuit) designed for use with other components, a portion of a program code (e.g., software or firmware) executable by a (micro) processor or processing circuitry that usually performs a particular function of related functions, or a self-contained hardware or software component that interfaces with a larger system, an application specific integrated circuit (ASIC), a Field Programmable Gate Array (FPGA), a circuit, a digital logic circuit, an analog circuit, a combination of discrete circuits, gates, or any other type of hardware or combination thereof.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a plurality of non-volatile memory cells;
a communication interface configured to receive data to store in the non-volatile memory cells, the data associated with logical addresses;
a first mapper configured to perform a random mapping from the logical addresses to intermediate addresses in an intermediate address space, the first mapper being further configured to change the random mapping from the logical addresses to the intermediate addresses from a period to a next period;
a second mapper configured to map the intermediate addresses to physical addresses in a physical address space that is divided into a plurality of buckets, wherein the logical addresses are mapped to physical addresses;
a write circuit configured to store the data to the physical addresses to which the logical addresses are initially mapped; and
a wear leveler configured to move data within buckets during a period responsive to a change in the mapping between the intermediate addresses to the physical addresses, the wear leveler being further configured to move data from one bucket to another bucket responsive to the change of the mapping from the logical addresses to the intermediate addresses.

2. The apparatus of claim 1, wherein the second mapper is further configured to change the mapping of an intermediate address within a bucket from one physical address to another physical address within the same bucket to trigger wear leveling within a bucket.

3. The apparatus of claim 1, wherein:
during a first period, a first of the logical addresses is mapped to a first intermediate address using a first random mapping, the first intermediate address is mapped to a first physical address in a first of the buckets, and the data for the first logical address is stored at the first physical address;
the first mapper is further configured to perform a second random mapping to cause the first logical address to map to a second intermediate address during a second period;
the second mapper is further configured to map the second intermediate address to a second physical address in a second of the buckets during the second period; and
the wear leveler is further configured to move the data associated with the first logical address from the first physical address to the second physical address during the second period.

4. The apparatus of claim 1 wherein, during a first period in which the mapping from the logical addresses to the intermediate addresses are static:
a first set of the logical addresses are mapped to a first set of intermediate addresses, the first set of intermediate addresses are mapped to a first set of physical addresses in a first of the buckets, and the data for the first set of logical addresses is stored at the first set of physical addresses; and
the wear leveler is configured to rotate data within the first bucket, including storing valid data to all physical addresses associated with the first bucket.

5. The apparatus of claim 1, wherein:
during a first period: a first set of the logical addresses are mapped to a first set of intermediate addresses using a first algebraic mapping, the first set of intermediate addresses are mapped to a first set of physical addresses in a first of the buckets, and the data for the first set of logical addresses is stored at the first set of physical addresses;
the first mapper is further configured to perform a second algebraic mapping to cause the first set of logical addresses to map to a second set of intermediate addresses during a second period; and
the second mapper is further configured to map the second set of intermediate addresses to a second set of physical addresses that are distributed in multiple ones of the buckets during the second period.

6. The apparatus of claim 1, wherein the wear leveler is further configured to swap the data at a first physical address in a first of the buckets with data at a second physical address in the first bucket.

7. The apparatus of claim 6, wherein the wear leveler in combination with the second mapper are further configured to rotate the data in the first bucket for a pre-determined number of cycles, with each cycle moving data from one end of the first bucket to the other end of the first bucket, and sliding all other data one position in the first bucket.

8. The apparatus of claim 7, wherein the second mapper is further configured to maintain a first pointer to a position in the first bucket, and a second pointer to a cycle of the number of bucket rotations.

9. The apparatus of claim 1, wherein the wear leveler is further configured to perform wear leveling in a given bucket responsive to a stochastic determination with respect to the number of writes to the physical addresses in the given bucket.

10. The apparatus of claim 1, wherein the wear leveler is further configured to perform wear leveling in a given bucket responsive to a count of the number of writes to the physical addresses in the given bucket exceeding a threshold.

11. The apparatus of claim 1, wherein the first mapper is further configured to repeat the random mapping from the logical addresses to the same intermediate addresses without consulting a stored mapping of the logical addresses to the intermediate addresses.

12. The apparatus of claim 1, wherein the random mapping is a memory-less mapping.

13. A method of operating non-volatile storage, the method comprising:
receiving data to write to the non-volatile storage having a physical address space that is divided into a plurality of buckets, the data being associated with logical addresses;
performing a random mapping from the logical addresses to intermediate addresses;
mapping the intermediate addresses to physical addresses in the physical address space, wherein each logical address is mapped to one physical address;
storing the data at the physical addresses to which the logical addresses are mapped;
performing wear-leveling within buckets to which the data is stored;
changing the random mapping of at least one of the logical addresses to a new intermediate address;
changing the mapping of the new intermediate address from a first physical address in a first bucket to a second physical address in a second bucket; and moving the data from the first physical address to the second physical address responsive to the changed mapping.

14. The method of claim 13, wherein performing wear-leveling within buckets comprises:
switching the mapping of an intermediate address within a bucket to from one physical address to another physical address within the same bucket.

15. The method of claim 13, wherein performing wear-leveling within buckets that receive the data comprises:
rotating the data in a bucket for a pre-determined number of cycles, with each cycle moving data from one end of the bucket to the other end of the bucket, and sliding all other data one position in the bucket.

16. The method of claim 15, wherein rotating the data comprises:
maintaining, in non-transitory storage, a cycle pointer for each of the buckets, the cycle pointer specifying how many of the pre-determined number of cycles have been performed; and
maintaining, in non-transitory storage, a position pointer for each of the buckets the position pointer specifying a position to which data which was at one end of the bucket at the start of the cycle has been moved to.

17. The method of claim 15, wherein performing the random mapping from the logical addresses to intermediate addresses comprises performing a memory-less algebraic mapping.

18. A non-volatile storage device, comprising:
a plurality of non-volatile memory cells;
communication means for receiving data to store in the non-volatile memory cells, the data associated with logical addresses;
first mapping means for performing a random mapping from the logical addresses to intermediate addresses, the first mapping means further for changing the random mapping from the logical addresses to the intermediate addresses from a period to a next period;
second mapping means for mapping the intermediate addresses to physical addresses in an address space that is divided into a plurality of buckets, wherein the second mapping means is further for changing the mapping between intermediate addresses to physical addresses within a period;
writing means for storing the received data to the physical addresses to which the logical addresses are initially mapped; and
wear leveling means for moving data within the buckets responsive to the second mapping means changing the mapping between intermediate addresses to physical addresses, the wear leveling means being further for moving data from one bucket to another bucket responsive to the change of the mapping from the logical addresses to the intermediate addresses from a period to a next period.

19. The non-volatile storage device of claim 18, wherein the first mapping means is further for changing one or more parameters in the random mapping between a first period and a second period in order to change the mapping from the logical addresses to the intermediate addresses, wherein the random mapping is static within each period.

20. The non-volatile storage device of claim 18, wherein:
the second mapping means further for:
changing the mapping of a first intermediate addresses within a bucket from a first physical address to a second physical address within the same bucket; and
changing the mapping of a second intermediate addresses within a bucket from the second physical address to the first physical address; and
the wear leveling means is further for moving the data stored at the first physical address with data stored at the second physical address responsive to the changed mapping of the second intermediate addresses.

* * * * *